United States Patent
Lee et al.

(10) Patent No.: US 11,836,015 B2
(45) Date of Patent: Dec. 5, 2023

(54) DISPLAY DEVICE

(71) Applicant: SAMSUNG DISPLAY CO., LTD., Yongin-si (KR)

(72) Inventors: Choon Hyop Lee, Anyang-si (KR); Kang Won Lee, Seoul (KR); Seung Hwan Chung, Seongnam-si (KR); Sang Chul Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/599,512

(22) PCT Filed: Feb. 11, 2020

(86) PCT No.: PCT/KR2020/001886
§ 371 (c)(1),
(2) Date: Sep. 28, 2021

(87) PCT Pub. No.: WO2020/197087
PCT Pub. Date: Oct. 1, 2020

(65) Prior Publication Data
US 2022/0171441 A1 Jun. 2, 2022

(30) Foreign Application Priority Data

Mar. 28, 2019 (KR) .......................... 10-2019-0035813

(51) Int. Cl.
*G06F 3/041* (2006.01)
*G06F 1/16* (2006.01)

(52) U.S. Cl.
CPC .......... *G06F 1/1684* (2013.01); *G06F 3/0412* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2015/0227227 A1 | 8/2015 | Myers et al. | |
| 2017/0168621 A1* | 6/2017 | Jo ......................... | G06F 3/0412 |
| 2017/0220174 A1 | 8/2017 | Kim et al. | |
| 2017/0371470 A1 | 12/2017 | Nathan et al. | |

FOREIGN PATENT DOCUMENTS

| | | |
|---|---|---|
| KR | 20150117958 | 10/2015 |
| KR | 20160149982 | 12/2016 |
| KR | 1020160150070 | 12/2016 |
| KR | 101693337 | 1/2017 |
| KR | 20180076443 | 7/2018 |

* cited by examiner

*Primary Examiner* — Brian M Butcher
(74) *Attorney, Agent, or Firm* — F. CHAU & ASSOCIATES, LLC

(57) ABSTRACT

A display device includes a display panel; a pressure sensor disposed on the display panel; and a lower bracket. The pressure sensor is disposed between the display panel and the lower bracket and is disposed on the lower bracket. The pressure sensor includes a first substrate, a first pressure sensing layer disposed between the first substrate and the lower bracket, a first driving electrode disposed between the first pressure sensing layer and the lower bracket, and a first sensing electrode spaced apart from the first driving electrode. A gap is present between the first pressure sensing layer, and the first driving electrode and the first sensing electrode.

20 Claims, 26 Drawing Sheets

DISPLAY DEVICE

CROSS-REFERENCE TO RELATED APPLICATIONS

The present application is a National Stage Application, filed under 35 U.S.C. § 371, of International Patent Application No. PCT/KR2020/001886, filed on Feb. 11, 2020, which claims priority to Korean Patent Application No. KR 10-2019-0035813, filed on Mar. 28, 2019, the contents of which are incorporated by reference herein in their entirety.

TECHNICAL FIELD

The present invention relates to a display device.

DISCUSSION OF THE RELATED ART

Electronic devices, such as smart phones, tablet personal computers (PCs), digital cameras, notebook computers, navigation systems, and smart televisions that provide images to users include display devices for displaying images. The display devices include display panels for generating and displaying images and various input devices.

Recently, touch panels that recognize touch inputs are being widely applied to display devices mainly in smart phones or tablet PCs. Due to the convenience of a touch method, the touch panel tends to replace the conventional physical input device such as a key pad.

Beyond the touch panel, research is currently being conducted to implement various inputs by mounting a pressure sensor on a display device. Furthermore, research is also being conducted to reduce an area occupied by the pressure sensor when the pressure sensor is mounted on the display device.

SUMMARY

A display device includes a display panel including a first side surface and a first lower surface that is connected to the first side surface and is a surface opposite to a display surface; a pressure sensor disposed on the first lower surface of the display panel; and a lower bracket including a second lower surface facing the first lower surface of the display panel and a second side surface facing the first side surface of the display panel, wherein the pressure sensor is disposed between the first lower surface of the display panel and the second lower surface of the lower bracket and disposed on the second side surface of the lower bracket, the pressure sensor includes a first substrate facing the second side surface of the lower bracket, a first pressure sensing layer disposed between the first substrate and the second side surface of the lower bracket, a first driving electrode disposed between the first pressure sensing layer and the second side surface of the lower bracket, and a first sensing electrode spaced apart from the first driving electrode, and a gap is present between the first pressure sensing layer, and the first driving electrode and the first sensing electrode.

A display device includes a display panel including a first side surface and a first lower surface that is connected to the first side surface and is a surface opposite to a display surface; a pressure sensor disposed on the first lower surface of the display panel; and a lower bracket including a second lower surface facing the first lower surface of the display panel and a second side surface facing the first side surface of the display panel, wherein the pressure sensor is disposed between the first lower surface of the display panel and the second lower surface of the lower bracket and disposed on the second side surface of the lower bracket, the second side surface of the lower bracket includes a first sub-side surface, a second sub-side surface, and a third sub-side surface that is recessed further than the first sub-side surface and the second sub-side surface, and the pressure sensor is disposed to overlap the third sub-side surface and is embedded in a side surface portion formed by the first to third sub-side surfaces.

DETAILED DESCRIPTION OF THE DRAWINGS

Figure 1:
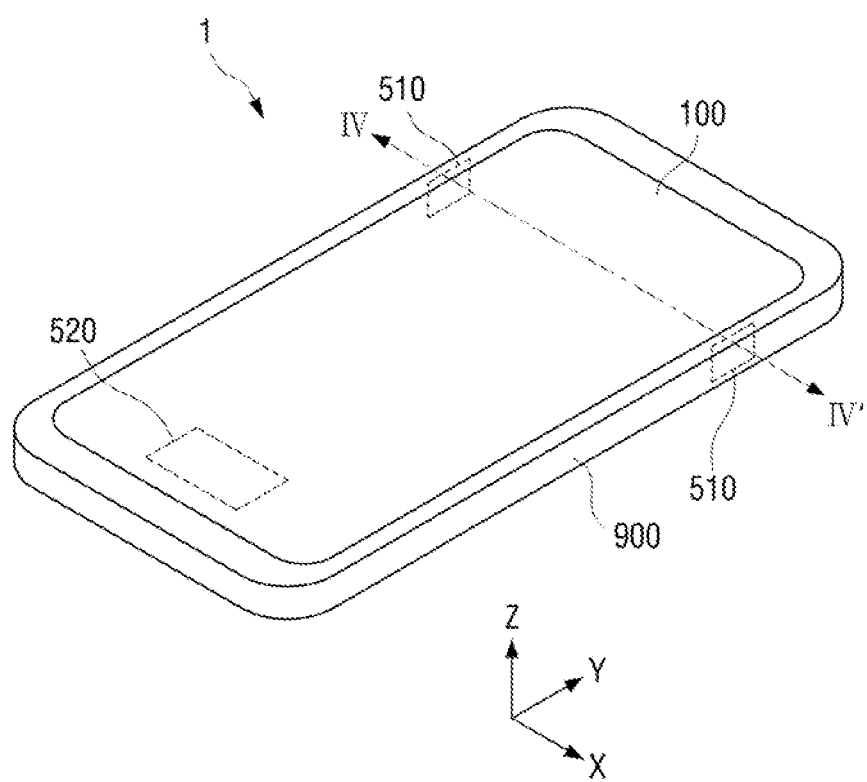
FIG. 1 is a perspective view illustrating a display device according to one embodiment.

Specific structural and functional descriptions of embodiments of the invention disclosed herein. The invention may be embodied in many different forms without departing from the spirit and significant characteristics of the invention.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification and the drawings, the same reference numerals may refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

Figure 2:
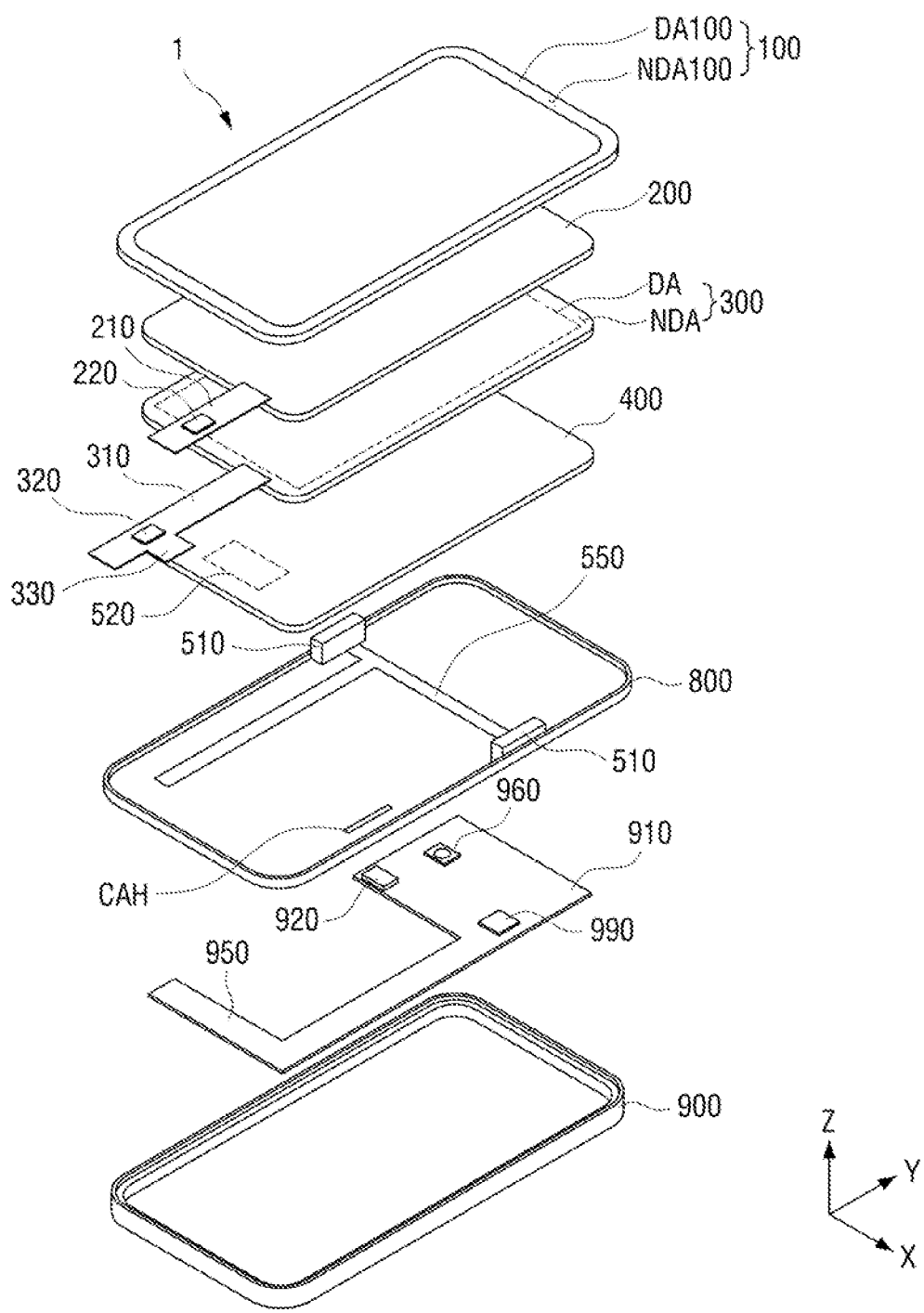
FIG. 2 is an exploded perspective view of the display device of FIG. 1.
Figure 3:
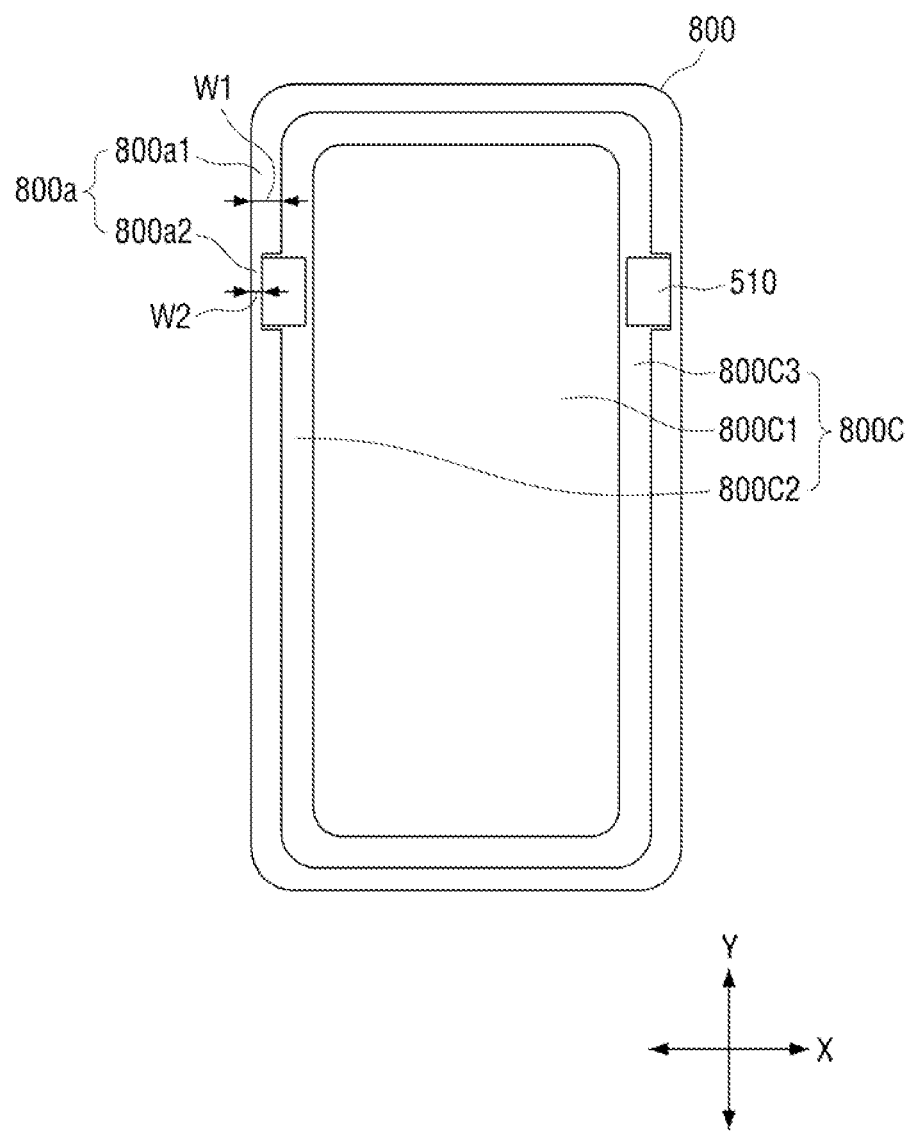
FIG. 3 is a schematic plan layout view of a pressure sensor and a lower bracket.
Figure 4:
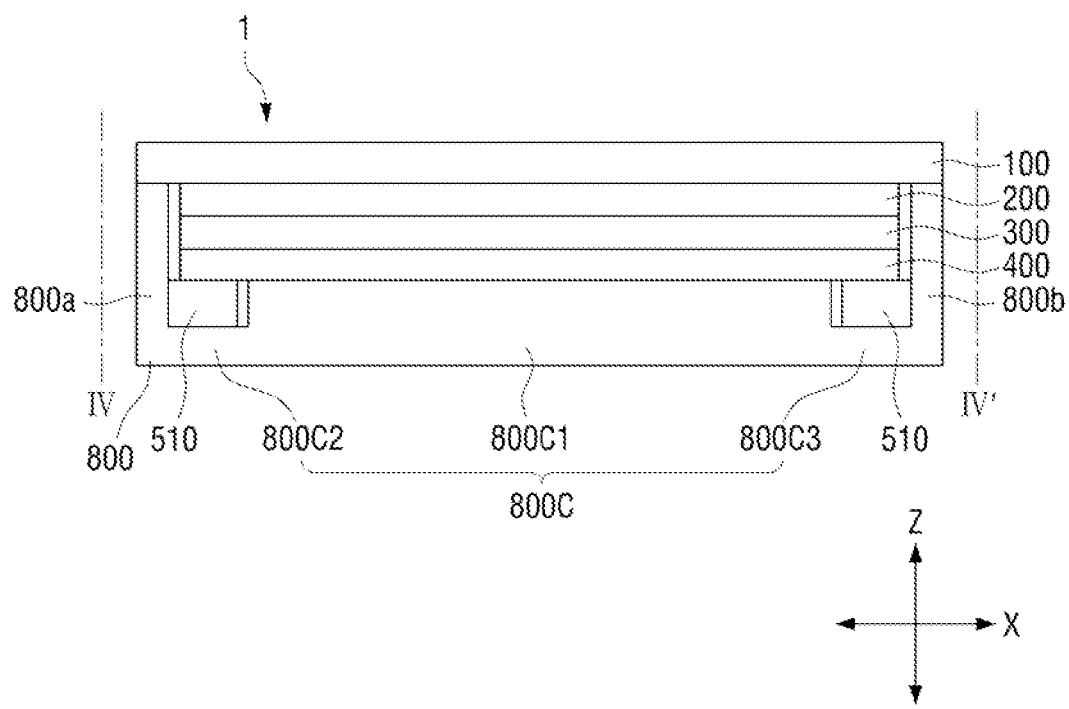
FIG. 4 is a cross-sectional view illustrating an example that is taken along line IV-IV' of FIG. 1.
Figure 5:
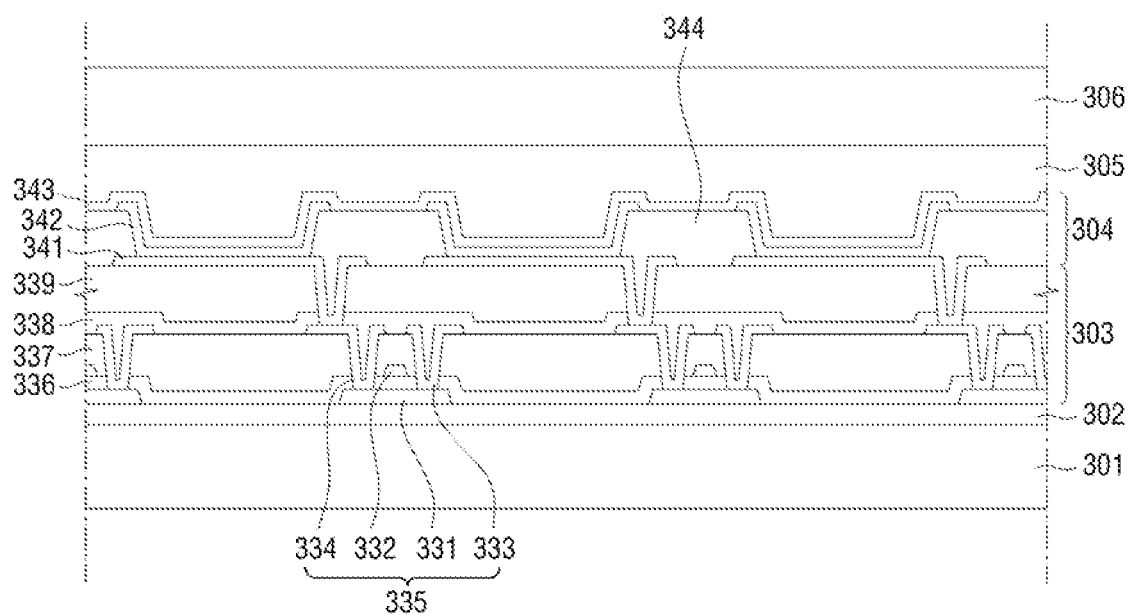
FIG. 5 is a cross-sectional view illustrating a display area of a display panel in FIG. 4 in detail.

FIG. 1 is a perspective view illustrating a display device according to one embodiment, FIG. 2 is an exploded perspective view of the display device of FIG. 1, FIG. 3 is a schematic plan layout view of a pressure sensor and a lower bracket, FIG. 4 is a cross-sectional view illustrating an example that is taken along line IV-IV' of FIG. 1, and FIG. 5 is a cross-sectional view illustrating a display area of a display panel in FIG. 4 in detail.

Referring to FIGS. 1 to 5, a display device 1 according to one embodiment includes a cover window 100, a touch sensing device 200, a touch circuit board 210, a display panel 300, a display circuit board 310, a panel lower member 400, a first pressure sensor 510, a second pressure sensor 520, a pressure driving board 550, a lower bracket 800, a main circuit board 910, and a lower cover 900.

In the present specification, the terms "upper portion," "top," and "upper surface" refer to a direction in which the window 100 is disposed with respect to the display panel 300, that is, a Z-axis direction, and the terms "lower portion," "bottom," and "lower surface" refer to a direction in which the panel lower member 400 is disposed with respect to the display panel 300, that is, a direction opposite to the Z-axis direction.

The display device 1 may be formed in a rectangular shape in a plan view. For example, as shown in FIG. 1, the display device 1 may have a rectangular planar shape that has short sides in a first direction (X-axis direction) and long sides in a second direction (Y-axis direction). A corner at which the short side in the first direction (X-axis direction)

meets the long side in the second direction (Y-axis direction) may be formed to be rounded to have a predetermined curvature or formed with a right angle. The planar shape of the display device 1 is not necessarily limited to the rectangular shape but may be formed in another polygonal shape, circular shape, or elliptical shape.

The cover window 100 may be disposed above the display panel 300 to cover an upper surface of the display panel 300. Thus, the cover window 100 may function to protect the upper surface of the display panel 300. The cover window 100 may be attached to the touch sensing device 200 through an adhesive layer 110. The adhesive layer 110 may be an optically clear adhesive film (OCA) or an optically clear resin (OCR).

The cover window 100 may include a light-transmitting portion DA100 corresponding to a display area DA of the display panel 300 and a light-blocking portion NDA100 corresponding to a non-display area NDA of the display panel 300. The light-blocking portion NDA100 of the cover window 100 may be formed to be opaque. Alternatively, the light-blocking portion NDA100 of the cover window 100 may be formed as a decorative layer having a pattern that is visible to a user when an image is not displayed. For example, a company logo such as "SAMSUNG" or various characters may be patterned on the light-blocking portion NDA100 of the cover window 100.

The cover window 100 may be made of glass, sapphire glass, and/or plastic. The cover window 100 may be formed to be rigid or flexible.

The touch sensing device 200, which includes touch sensors for sensing a user's touch, may be disposed between the cover window 100 and the display panel 300. The touch sensing device 200 may be a device for sensing a touch position of a user and may be implemented in a capacitance type such as a self-capacitance type or a mutual capacitance type or implemented in an infrared type.

The touch sensing device 200 may be formed in a panel form or a film form. Alternatively, the touch sensing device 200 may be integrally formed with the display panel 300. For example, when the touch sensing device 200 is formed in the film form, the touch sensing device 200 may be integrally formed with a barrier film for encapsulating the display panel 300.

The touch circuit board 210 may be attached to one side of the touch sensing device 200. Specifically, the touch circuit board 210 may be attached to pads provided on one side of the touch sensing device 200 using an anisotropic conductive film. In addition, a touch connection portion may be provided on the touch circuit board 210 and may be connected to a connector of the display circuit board 310. The touch circuit board may be a flexible printed circuit board or a chip-on film.

A touch driver 220 may apply touch driving signals to the touch sensing device 200, sense sensing signals from the touch sensing device 200, and calculate a touch position of a user by analyzing the sensing signals. The touch driver 220 may be formed as an integrated circuit and mounted on the touch circuit board 210.

The display panel 300 may include the display area DA and the non-display area NDA. The display area DA is an area in which an image is displayed, and the non-display area NDA may be an area in which an image is not displayed and may be a peripheral area of the display area NDA. The non-display area NDA may be disposed to surround the display area DA as shown FIG. 2, but the present invention is not necessarily limited thereto. The display area DA may overlap the light-transmitting portion 100DA of the cover window 100, and the non-display area NDA may overlap the light-blocking portion 100NDA of the cover window 100.

The display panel 300 may be a light-emitting display panel including a light-emitting element. For example, the display panel 300 may be an organic light-emitting display panel using organic light-emitting diodes (LEDs), a micro light-emitting diode display panel using micro LEDs, or a quantum dot light-emitting display panel including quantum dot LEDs. Hereinafter, a case in which the display panel 300 is an organic light-emitting display panel will be mainly described.

The display area DA of the display panel 300 refers to an area in which a light-emitting element layer 304 is formed to display an image, and the non-display area NDA refers to a peripheral area of the display area DA.

As shown in FIG. 5, the display panel 300 may include a support substrate 301, a flexible substrate 302, a thin-film transistor layer 303, the light-emitting element layer 304, an encapsulation layer 305, and a barrier film 306.

The flexible substrate 302 is disposed on the support substrate 301. Each of the support substrate 301 and the flexible substrate 302 may include a polymer material having flexibility. For example, each of the support substrate 301 and the flexible substrate 302 may include polyethersulphone (PES), polyacrylate (PA), polyarylate (PAR), polyetherimide (PEI), polyethylenenapthalate (PEN), polyethyleneterepthalate (PET), polyphenylenesulfide (PPS), polyallylate, polyimide (PI), polycarbonate (PC), cellulose triacetate (CAT), cellulose acetate propionate (CAP), or a combination thereof.

The thin-film transistor layer 303 is formed on the flexible substrate 302. The thin-film transistor layer 303 includes thin-film transistors 335, a gate insulating film 336, an interlayer insulating film 337, a protective film 338, and a planarization film 339.

A buffer film may be formed on the flexible substrate 302. The buffer film may be formed on the flexible substrate 302 to protect the thin-film transistors 335 and light-emitting elements from moisture penetrating through the support substrate 301 and the flexible substrate 302 that are vulnerable to moisture permeation. The buffer film may be formed of a plurality of inorganic films that are alternately stacked. For example, the buffer film may be formed as a multilayer film in which one or more inorganic films among a silicon oxide (SiOx) film, a silicon nitride (SiNx) film, and a SiON film are alternately stacked. The buffer film may be omitted.

Figure 8:
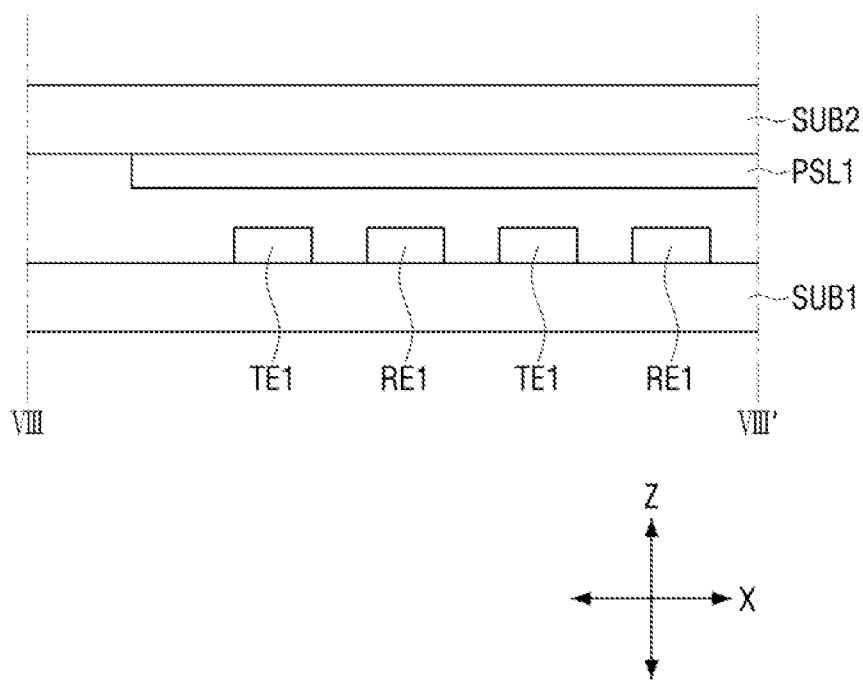
FIG. 8 is a cross-sectional view taken along line VIII-VIII' of FIG. 7.

The thin-film transistor 335 is formed on the buffer film. The thin-film transistor 335 includes an active layer 331, a gate electrode 332, a source electrode 333, and a drain electrode 334. The thin-film transistor 335 is illustrated in FIG. 8 as being formed as a top gate type in which the gate electrode 332 is disposed on the active layer 331, but it should be noted that the present invention is not necessarily limited thereto. That is, the thin-film transistor 335 may be formed in a bottom gate type in which the gate electrode 332 is disposed below the active layer 331 or a double gate type in which the gate electrode 332 is disposed on both of upper and lower portions of the active layer 331.

The active layer 331 is formed on the buffer film. The active layer 331 may be formed of a silicon-based semiconductor material or an oxide-based semiconductor material. A light-blocking layer for blocking external light that is incident on the active layer 331 may be formed between the buffer film and the active layer 331.

The gate insulating film 336 may be formed on the active layer 331. The gate insulating film 316 may be formed as an inorganic film such as a silicon oxide film (SiOx), a silicon nitride film (SiNx), or a multilayer film thereof.

The gate electrode 332 and a gate line may be formed on the gate insulating film 316. Each of the gate electrode 332 and the gate line may be formed as a single layer or a multilayer made of one selected from among molybdenum (Mo), aluminum (Al), chromium (Cr), gold (Au), titanium (Ti), nickel (Ni), neodymium (Nd), and copper (Cu), or an alloy thereof.

The interlayer insulating film 337 may be formed on the gate electrode 332 and the gate line. The interlayer insulating film 337 may be formed as an inorganic film such as a silicon oxide film (SiOx), a silicon nitride film (SiNx), or a multilayer film thereof.

The source electrode 333, the drain electrode 334, and a data line may be formed on the interlayer insulating film 337. Each of the source electrode 333 and the drain electrode 334 may be connected to the active layer 331 through a contact hole passing through the gate insulating film 336 and the interlayer insulating film 337. Each of the source electrode 333, the drain electrode 334, and the data line may be formed as a single layer or a multilayer made of one selected from among molybdenum (Mo), aluminum (Al), chromium (Cr), gold (Au), titanium (Ti), nickel (Ni), neodymium (Nd), and copper (Cu), and an alloy thereof.

The protective film 338 for insulating the thin-film transistor 335 may be formed on the source electrode 333, the drain electrode 334, and the data line. The protective film 338 may be formed as an inorganic film such as a silicon oxide film (SiOx), a silicon nitride film (SiNx), or a multilayer film thereof.

The planarization film 339 may be formed on the protective film 338 to planarize a step difference due to the thin-film transistor 335. The planarization film 339 may be formed as an organic film made of an acryl resin, an epoxy resin, a phenolic resin, a polyamide resin, a polyimide resin, or the like.

The light-emitting element layer 304 may be formed on the thin-film transistor layer 303. The light-emitting element layer 304 includes the light-emitting elements and a pixel-defining film 344.

The light-emitting elements and the pixel-defining film 344 are formed on the planarization film 339. The light-emitting element may be an organic light-emitting device. In this case, the light-emitting element may include an anode 341, light-emitting layers 342, and a cathode 343.

The anode 341 may be formed on the planarization film 339. The anode 341 may be connected to the source electrode 333 of the thin-film transistor 335 through a contact hole passing through the protective film 338 and the planarization film 339.

In order to partition pixels, the pixel-defining film 344 may be formed on the planarization film 339 to cover an edge of the anode 341. That is, the pixel-defining film 344 serves as a pixel-defining film configured to define the pixels. Each of the pixels represents an area in which the anode 341, the light-emitting layer 342, and the cathode 343 are sequentially stacked and in which a hole from the anode 341 and an electron from the cathode 343 are combined in the light-emitting layer 342 to emit light.

The light-emitting layers 342 are formed on the anode 341 and the pixel-defining film 344. The light-emitting layer 342 may be an organic light-emitting layer. The light-emitting layer 342 may emit one among red light, green light, and blue light. A peak wavelength range of the red light may range from about 620 nm to 750 nm, and a peak wavelength range of the green light may range from about 495 nm to 570 nm. In addition, a peak wavelength range of the blue light may range from about 450 nm to 495 nm. Alternatively, the light-emitting layer 342 may be a white light-emitting layer that emits white light, and in this case, the light-emitting layer 342 may have a form in which a red light-emitting layer, a green light-emitting layer, and a blue light-emitting layer are stacked, and the light-emitting layer 342 may be a common layer that is commonly formed in the pixels. In this case, the display panel 300 may further include separate color filters for displaying a red color, a green color, and a blue color.

The light-emitting layer 342 may include a hole transporting layer, a light-emitting layer, and an electron transporting layer. Further, the light-emitting layer 342 may be formed to have a tandem structure of two stacks or more, and in this case, a charge generation layer may be formed between the stacks.

In some embodiments, the display panel 300 may emit blue light or ultraviolet light having a wavelength range adjacent to a wavelength range of the blue light and may further include light conversion patterns that are disposed in each pixel disposed above the light-emitting layer 342. Each of the light conversion patterns may include a first wavelength conversion pattern for converting emitted light (e.g., blue light or ultraviolet light) emitted from the light-emitting layer 342 into red light, a second wavelength conversion pattern for converting the emitted light (e.g., blue light or ultraviolet light) emitted from the light-emitting layer 342 into green light, and a light-transmitting pattern for emitting the emitted light (e.g., blue light or ultraviolet light) emitted from the light-emitting layer 342 without change.

The first wavelength conversion pattern may include a first base resin and a first wavelength shifter dispersed in the first base resin and may further include a first scatterer dispersed in the first base resin.

The first wavelength shifter may convert or shift a peak wavelength of incident light into another specific peak wavelength. Examples of the first wavelength shifter may include quantum dots, quantum rods, phosphors, or the like that convert the emitted light (blue light or ultraviolet light) into red light having a red wavelength range.

The second wavelength conversion pattern may include a second base resin and a second wavelength shifter dispersed in the second base resin and may further include a second scatterer dispersed in the second base resin.

The second wavelength shifter may convert or shift a peak wavelength of incident light into another specific peak wavelength. Examples of the second wavelength shifter may include quantum dots, quantum rods, phosphors, or the like that convert the emitted light (blue light or ultraviolet light) into red light having a green wavelength range.

The light conversion pattern may include a third base resin and a third scatterer dispersed in the third base resin.

In some embodiments, the light-emitting layer 342 may include the base resin and a wavelength shifter dispersed in the base resin. That is, the red light-emitting layer may include the first base resin and the first wavelength shifter, the green light-emitting layer may include the second base resin and the second wavelength shifter, and the blue light-emitting layer may include the third base resin. In some embodiments, each of the red light-emitting layer, the green light-emitting layer, and the blue light-emitting layer may further include the scatterer.

In some embodiments, the light-emitting layer 342 may include an inorganic material. That is, the light-emitting layer 342 may be an LED, and specifically, may be an inorganic LED having a size of a micrometer or nanometer scale and may be made of an inorganic material. The inorganic LEDs may be aligned between two electrodes in which polarity is formed by forming an electric field in a specific direction between the two electrodes facing each other. The LEDs may be aligned between two electrodes due to the electric field formed on the two electrodes.

The cathode 343 is formed on the light-emitting layer 342. The second electrode 343 may be formed to cover the light-emitting layer 342. The second electrode 343 may be a common layer that is commonly formed in the pixels.

When the light-emitting element layer 304 is formed in a top emission type in which light is emitted upward, the anode 341 may be made of a conductive (metallic) material having high reflectivity, and for example, may include a stacked structure (Ti/Al/Ti) of aluminum and titanium, a stacked structure (ITO/Al/ITO) of aluminum and indium tin oxide (ITO), a silver-palladium-copper (APC) alloy, and a stacked structure (ITO/APC/ITO) of an APC alloy and ITO. The APC alloy is an alloy of silver (Ag), palladium (Pd), and copper (Cu). In addition, the cathode 263 may be made of a transparent conductive material (TCO) such as ITO or IZO, which is light-transmissive, or a semi-transmissive conductive material such as magnesium (Mg), silver (Ag), or an alloy of magnesium (Mg) and silver (Ag). When the cathode 343 is made of the semi-transmissive conductive (metallic) material, light output efficiency may be increased by a microcavity.

When the light-emitting element layer 304 is formed in a bottom emission type in which light is emitted downward, the anode 341 may be made of a transparent conductive material (TCO), such as ITO or IZO, or may be made of a semi-transmissive conductive material such as magnesium (Mg), silver (Ag), or an alloy of magnesium (Mg) and silver (Ag). The second electrode 343 may be made of a conductive material that has high reflectivity, such as a stacked structure (Ti/Al/Ti) of aluminum and titanium, a stacked structure (ITO/Al/ITO) of aluminum and ITO, a silver-palladium-copper (APC) alloy, and a stacked structure (ITO/APC/ITO) of an APC alloy and ITO. When the anode 341 is made of the semi-transmissive conductive material, light output efficiency may be increased by a microcavity.

The encapsulation layer 305 is formed on the light-emitting element layer 304. The encapsulation layer 305 serves to prevent oxygen or moisture from penetrating into the light-emitting layer 342 and the cathode 343. To this end, the encapsulation layer 305 may include at least one inorganic film. The inorganic film may be made of silicon nitride, aluminum nitride, zirconium nitride, titanium nitride, hafnium nitride, tantalum nitride, silicon oxide, aluminum oxide, or titanium oxide. In addition, the encapsulation layer 305 may further include at least one organic film. The organic film may be formed to have a sufficient thickness to prevent foreign particles from passing through the encapsulation layer 305 to enter the light-emitting layer 342 and the cathode 343. The organic film may include any one among epoxy, acrylate, and urethane acrylate.

The barrier film 306 is disposed on the encapsulation layer 305. The barrier film 306 is disposed to cover the encapsulation layer 305 so as to protect the light-emitting element layer 304 from oxygen or moisture. The barrier film 306 may be integrally formed with the touch sensing device 200.

A polarizing film may be additionally attached to the upper surface of the display panel 300 to prevent degradation of visibility due to reflection of external light.

The display circuit board 310 may be attached to one side of the display panel 300. Specifically, the display circuit board 310 may be attached to pads provided on one side of the display panel 300 using an anisotropic conductive film.

The touch circuit board 210 and the display circuit board 310 may be bent downward from an upper portion of the display panel 300 as shown in FIG. 2. The display circuit board 310 may be connected to the touch connection portion of the touch circuit board 210 through the connector. Alternatively, the display circuit board 310 may include pads, which correspond to the connector, instead of the connector, and in this case, the display circuit board 310 may be connected to the touch circuit board 210 using anisotropic conductive films. The display circuit board 310 may be connected to the main circuit board 910 through another connector 330.

A display driver 320 outputs signals and voltages for driving the display panel 300 through the display circuit board 310. The display driver 320 may be formed as an integrated circuit and mounted on the display circuit board 310, but the present invention is not necessarily limited thereto. For example, the display driver 320 may be attached to one side of the display panel 300.

The panel lower member 400 may be disposed on a lower surface of the display panel 300. The panel lower member 400 may include at least one of a heat dissipation layer configured to efficiently dissipate heat from the display panel 300, an electromagnetic wave shielding layer configured to shield an electromagnetic wave, a light-blocking layer configured to block light incident from the outside, a light-absorbing layer configured to absorb light incident from the outside, and a buffer layer configured to absorb an impact from the outside.

Specifically, the panel lower member 400 may include a light-absorbing member, a buffer member, and a heat dissipation member.

The light-absorbing member may be disposed below the display panel 300. The light-absorbing member prevents transmission of light to prevent elements disposed below the light-absorbing member, i.e., the first pressure sensor 510 and the second pressure sensor 520, from being visible from above the display panel 300. The light-absorbing member may include a light-absorbing material such as a black pigment or a dye.

The buffer member may be disposed below the light-absorbing member. The buffer member absorbs an external impact to prevent the display panel 300 from being damaged. The buffer member may include a single layer or a plurality of layers. For example, the buffer member may be made of a polymer resin such as polyurethane, polycarbonate, polypropylene, or polyethylene or may be made of a material having elasticity, such as a sponge formed by foam-molding rubber, a urethane-based material, or an acrylic-based material. The buffer member may be a cushion layer.

The heat dissipation member may be disposed below the buffer member. The heat dissipation member may include at least one heat dissipation layer. For example, the heat dissipation member may include a first heat dissipation layer including graphite, carbon nano tubes, or the like and a second heat dissipation layer formed as a thin film of copper, nickel, ferrite, or silver, which is capable of shielding an electromagnetic wave and excellent in thermal conductivity.

The first pressure sensor 510 may be disposed on a side surface of the lower bracket 800. Specifically, the first pressure sensor 510 may be disposed on an inner side surface of the lower bracket 800. Accordingly, the first pressure sensor 510 may sense a pressure applied to the side surface of the lower bracket 800.

More specifically, the display panel 300 may include a first side surface facing a side portion of the lower bracket 800, and a first lower surface that is connected to the first side surface of the display panel 300 and is a surface opposite to a display surface. The first pressure sensor 510 may be disposed to overlap the first lower surface of the display panel 300 in a thickness direction.

The second pressure sensor 520 may be disposed below the panel lower member 400. The second pressure sensor 520 may be disposed close to one side of the panel lower member 400. The second pressure sensor 520 may sense a pressure applied to the light-transmitting portion DA100a of the cover window 100.

The first pressure sensor 510 and the second pressure sensor 520 may be utilized as substitutes for physical buttons of the display device 1.

For example, the second pressure sensor 520 disposed on the lower portion of the panel lower member 400 may be utilized as a substitute for a power button of the display device 1, and the first pressure sensor 510 disposed on the inner side surface of the lower bracket 800 may be utilized as a substitute for a sound control button of the display device 1. That is, when a second pressure is sensed by the second pressure sensor 520, a screen of the display device 1 may be turned off. Alternatively, when a first pressure higher than the second pressure is sensed by the second pressure sensor 520 or the second pressure is continuously sensed for a predetermined period of time, a screen for selecting a power-off of the display device 1 may be displayed. In addition, when a third pressure is sensed by a first pressure sensing cell of the first pressure sensor 510 disposed on the inner side surface of the lower bracket 800, a sound of the display device 1 may be decreased, and when a fourth pressure is sensed by a second pressure sensing cell, the sound of the display device 1 may be increased.

The first pressure sensor 510 and the second pressure sensor 520 will be described in detail below.

The lower bracket 800 may be disposed below the panel lower member 400. The lower bracket 800 may include a synthetic resin, a metal, or both the synthetic resign and the metal.

Specifically, the lower bracket 800 may be disposed to surround the cover window 100, the touch sensing device 200, the display panel 300, the panel lower member 400, the first pressure sensor 510, the second pressure sensor 520, the touch circuit board 210, the display circuit board 310, and the like. In addition, the lower bracket 800 is disposed on a first direction (X-axis direction) of the first pressure sensor 510 to support the first pressure sensor 510 by the side surface thereof, so that the first pressure sensor 510 may sense a pressure applied to the side surface of the lower bracket 800.

The main circuit board 910 may be disposed below the lower bracket 800. The main circuit board 910 may be connected to another connector of the display circuit board 310 through a cable connected to a main connector 920. Accordingly, the main circuit board 910 may be electrically connected to the display circuit board 310 and the touch circuit board 210. In addition, when the pressure sensing board 550 is connected to the display circuit board 310 or the touch circuit board 210, the main circuit board 910 may be electrically connected to the pressure sensing board 550. The main circuit board 910 may be a printed circuit board or a flexible printed circuit board.

The main circuit board 910 may include a main processor 990 and a camera device 960. In FIG. 2, the case in which the main processor 990, the camera device 960, and the main connector 920 are mounted on one surface of the main circuit board 910, which faces the lower bracket 800, is illustrated, but the present invention is not necessarily limited thereto. That is, the main processor 990, the camera device 960, and the main connector 920 may be mounted on the other surface of the main circuit board 910, which faces the lower cover 900.

The main processor 990 may control all the functions of the display device 1. For example, the main processor 990 may output image data to the display driver 320 of the display circuit board 310 so that the display panel 300 may display an image. In addition, the main processor 990 may receive touch data from the touch driver 220 and determine a touch position of a user and then execute an application indicated by an icon displayed at the touch position of the user. In addition, the main processor 990 may receive pressure sensing data from a pressure sensing portion FD and may control such that a home screen is output, a sound volume of the display device 1 is controlled, or a haptic is implemented according to the pressure sensing data. The main processor 990 may be an application processor, a central processing unit, or a system chip formed as an integrated circuit.

The camera device 960 processes an image frame such as a still image or a video, which is obtained by an image sensor in a camera mode, and outputs the processed image frame to the main processor 990.

In addition, the main circuit board 910 may be further equipped with a mobile communication module capable of transmitting and receiving a wireless signal to and from at least one of a base station, an external terminal, and a server on a mobile communication network. The wireless signal may include various types of data associated with transmission and reception of a voice signal, a video call signal, or a text/multimedia message. In addition, the main circuit board 910 may be further equipped with a sound output device capable of outputting sound and a vibration device capable of generating vibration for haptic implementation.

The lower cover 900 may be disposed below the lower bracket 800 and the main circuit board 910. The lower cover 900 may form a lower exterior of the display device 1. The lower cover 900 may include plastic and/or a metal.

Referring to FIGS. 3 and 4, the lower bracket 800 may include a bracket side portion 800a disposed on the side surfaces of the first pressure sensor 510, the cover window 100, the touch sensing device 200, the touch circuit board 210, the display panel 300, the display circuit board 310, and the panel lower member 400 and may include a lower support portion 800C that supports the first pressure sensor 510, the cover window 100, the touch sensing device 200, the touch circuit board 210, the display panel 300, the display circuit board 310, and the panel lower member 400 from the lower portions thereof.

The bracket side portion 800a and the lower support portion 800C are physically connected. The lower support portion 800C may include a first support portion 800C1 disposed in a central area, a second support portion 800C2 located at one side of the first support portion 800C1 in the first direction (X direction), and a third support portion 800C2 located at the other side of the first support portion 800C1 in the first direction (X direction). Each of the second support portion 800C2 and the third support portion 800C3 may overlap the first pressure sensor 510, the cover window 100, the touch sensing device 200, the touch circuit board 210, the display panel 300, the display circuit board 310, and the panel lower member 400 in the thickness direction, while the first support portion 800C1 might not overlap the first pressure sensor 510 in the thickness direction.

The lower support portion 800C may include an upper surface facing the display panel 300 thereabove and a lower surface that is an opposite surface of the upper surface, and the upper surface of the first support portion 800C1 may protrude further than the upper surface of each of the second support portion 800C2 and the third support portion 800C3 in a third direction (Z-direction). In other words, the upper surface of each of the second support portion 800C2 and the third support portion 800C3 may be recessed further downward than the upper surface of the first support portion 800C1 in the third direction (Z-direction). The first pressure sensor 510 may be disposed on the recessed upper surface of each of the second support portion 800C2 and the third support portion 800C3.

The bracket side portion 800a may include a plurality of side portions and serve to support the first pressure sensor 510, and the first pressure sensor 510 may be mounted on and attached to the bracket side portion 800a.

The bracket side portion 800a may include a first sub-side portion 800a1 and a second sub-side portion 800a2 which have different widths in the first direction (X direction). The width of the first sub-side portion 800a1 in the first direction (X direction) may be greater than the width of second sub-side portion 800a2 in the first direction (X direction). As shown in FIG. 3, the first sub-side portions 800a1 may be spaced apart from each other through the second sub-side portion 800a2.

The first sub-side portions 800a1 spaced apart from each other may be referred to as other components. That is, the sub-side portion located on an upper side of the second sub-side portion 800a2 in the second direction (Y direction) may be a first sub-side portion, and the sub-side portion located on a lower side of the second sub-side portion 800a2 in the second direction (Y direction) may be a third sub-side portion. The first sub-side portion and the third sub-side portion may each be physically connected to the adjacent second sub-side portion 800a2.

The bracket side portion 800a may include a first surface facing the first pressure sensor 510 and a second surface that is a surface opposite to the first surface. The first surface of the bracket side portion 800a at the first sub-side portion 800a1 may protrude inward further than the first surface of the bracket side portion 800a at the second sub-side portion 800a2.

That is, in other words, the first surface of the lower bracket 800 may include a first sub-side surface, a second sub-side surface, and a third sub-side surface recessed further than the first sub-side surface and the second sub-side surface, and the first pressure sensor 510 may be disposed to overlap the third sub-side surface in the first direction (X direction) and may be embedded in the bracket side portion 800a formed by the first to third sub-side portions.

Hereinafter, the pressure sensor will be described in detail. Hereinafter, the above-described first pressure sensor 510 will be mainly described as the pressure sensor, but it is obvious that the following description may be specifically applied to the case of the second pressure sensor 520.

Figure 6:
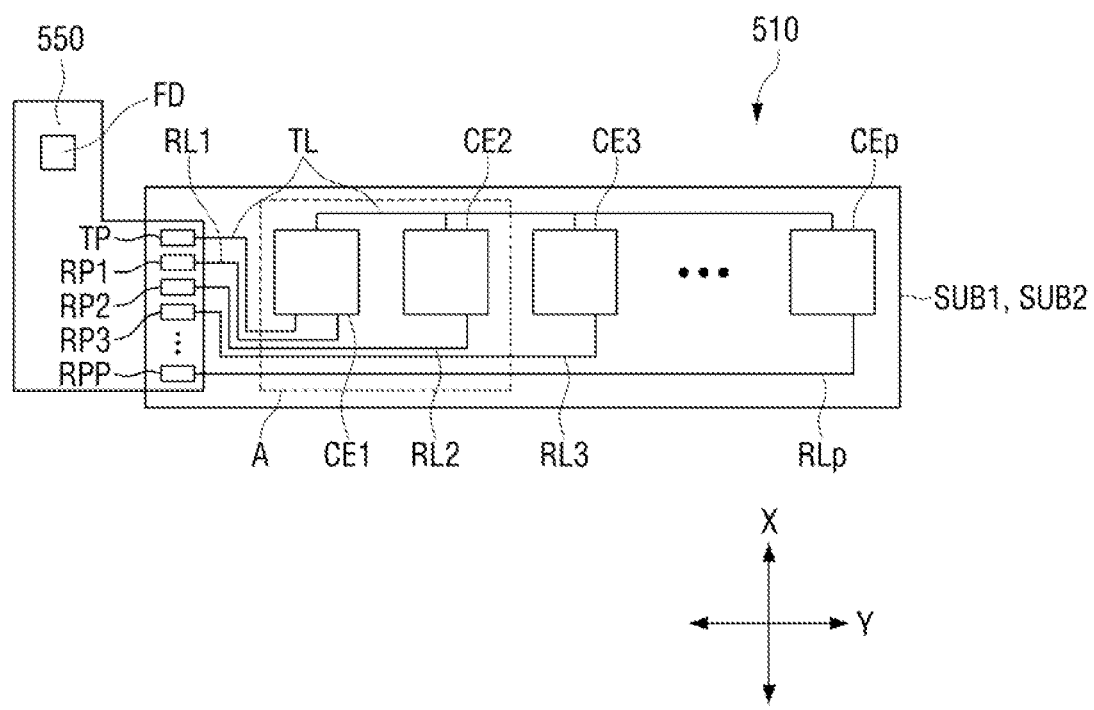
FIG. 6 is a plan view illustrating the pressure sensor according to one embodiment.
Figure 7:
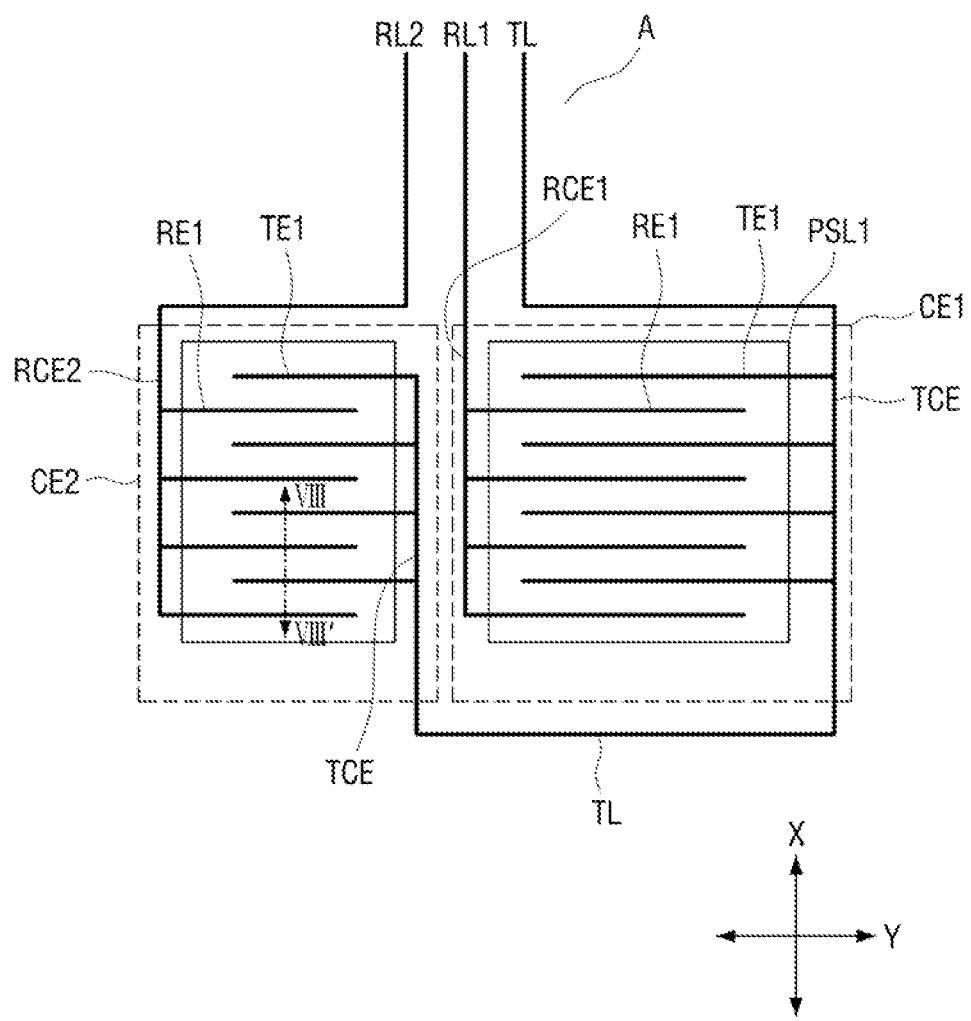
FIG. 7 is a plan view illustrating an example of area A of FIG. 6.

FIG. 6 is a plan view illustrating the pressure sensor according to one embodiment, FIG. 7 is a plan view illustrating an example of area A of FIG. 6, and FIG. 8 is a cross-sectional view taken along line VIII-VIII' of FIG. 7.

Referring to FIGS. 6 to 8, the first pressure sensor 510 may have a shape extending in one direction, for example, the second direction (Y direction), in a plan view, and in this case, the first pressure sensor 510 may have a length in an extending direction that is greater than a width. However, the shape of the first pressure sensor 510 is not necessarily limited thereto and may be varied according to a position at which the first pressure sensor 510 is applied.

The first pressure sensor 510 includes a first substrate SUB1, a second substrate SUB2, a driving line TL, first to p-th sensing lines RL1 to RLp (where p is an integer that is greater than or equal to 2), a driving pad TP, first to p-th sensing pads RP1 to RPp, and pressure sensing cells CE1 to CEp.

The first substrate SUB1 and the second substrate SUB2 are disposed to face each other.

The pressure sensing cells CE1 to CEp are disposed between the first substrate SUB1 and the second substrate SUB2. The driving line TL, the first to p-th sensing lines RL1 to RLp, the driving pad TP, and the first to p-th sensing pads RP1 to RPp are disposed on one surface of the first substrate SUB1 facing the second substrate SUB2. The pressure sensing cells CE1 to CEp are disposed between the first substrate SUB1 and the second substrate SUB2.

Each of the pressure sensing cells CE1 to CEp may independently sense a pressure of a corresponding position. Although the pressure sensing cells CE1 to CEp are illustrated as being arranged in one row in FIG. 6, the present invention is not necessarily limited thereto. The pressure sensing cells CE1 to CEp may be arranged in a plurality of rows, as necessary. In addition, as shown in FIG. 1, the pressure sensing cells CE1 to CEp may be disposed to be spaced apart from each other by a predetermined interval or may be consecutively disposed.

The pressure sensing cells CE1 to CEp may have different areas according to use. For example, when the pressure sensing cells CE1 to CEp are used as physical buttons, such as volume control buttons disposed on a side surface of the display device 1 as shown in FIG. 1, the pressure sensing cells CE1 to CEp may be formed to have an area similar to an area of the physical buttons. In addition, when the pressure sensing cells CE1 to CEp are used to detect a pressure applied to a front surface of the display device 1 as shown in FIG. 1, the pressure sensing cells CE1 to CEp may be formed to have a size corresponding to a pressure sensing area.

Each of the pressure sensing cells CE1 to CEp may be connected to at least one driving line and at least one sensing line. For example, as shown in FIG. 6, the pressure sensing cells CE1 to CEp are commonly connected to one driving line TL, whereas the pressure sensing cells CE1 to CEp may be respectively connected to the sensing lines RL1 to RLp. A first pressure sensing cell CE1 may be connected to the driving line TL and the first sensing line RL1, and a second pressure sensing cell CE2 may be connected to the driving line TL and the second sensing line RL2. In addition, a third pressure sensing cell CE3 may be connected to the driving line TL and the third sensing line RL3, and a p-th pressure sensing cell CEp may be connected to the driving line TL and the p-th sensing line RLp.

The driving line TL may be connected to the driving pad TP, and the first to p-th sensing lines RL1 to RLp may be respectively connected to the first to p-th sensing pads RP1 to RPp. The first sensing line RL1 may be connected to the first sensing pad RP1, the second sensing line RL2 may be connected to the second sensing pad RP2, the third sensing line RL3 may be connected to the third sensing pad RP3, and the p-th sensing line RLp may be connected to the p-th sensing pad RPp. The driving pad TP and the first to p-th sensing pads RP1 to RPp may be disposed on one side of the first substrate SUB1 and connected to the pressure sensing board 550 through an anisotropic conductive film.

The pressure sensing board 550 may include the pressure sensing portion FD. The pressure sensing portion FD may apply a driving voltage to the driving line TL through the driving pads TP and sense current values or voltage values from the sensing lines RL1 to RLp through the sensing pads RP1 to RPp, thereby sensing a pressure applied to the pressure sensing cells CE1 to CEp. The pressure sensing portion FD may be mounted on the pressure sensing board 550 or mounted on another circuit board connected to the pressure sensing board 550. When the pressure sensing portion FD is mounted on another circuit board connected to the pressure sensing board 550, the pressure sensing portion FD may be integrated with a driver that performs a different function. For example, the pressure sensing portion FD may be integrated with the touch driver 220 of the touch circuit board 210 shown in FIG. 2.

The first pressure sensor 510 may further include a bonding layer that is disposed between the first substrate SUB1 and the second substrate SUB2 and bonds the first substrate SUB1 to the second substrate SUB2. The bonding layer may be formed of a pressure-sensitive adhesive layer or an adhesive layer. The bonding layer may be disposed along peripheries of the first substrate SUB1 and the second substrate SUB2. In one embodiment, the bonding layer may completely surround edges of the first substrate SUB1 and the second substrate SUB2 and serve to seal an interior of the first pressure sensor 510. In addition, the bonding layer may serve as a spacer for consistently maintaining a gap between the first substrate SUB1 and the second substrate SUB2. The bonding layer might not overlap the driving line TL, the sensing lines RL1 to RLp, the pressure sensing cells CE1 to CEp, the driving pad TP, and the sensing pads RP1 to RPp.

The bonding layer may be first bonded to one surface of the first substrate SUB1 or the second substrate SUB2 and then bonded to one surface of the other substrate during the process of bonding the first substrate SUB1 and the second substrate SUB2. As another example, the bonding layer may be provided on one surface of each of the first substrate SUB1 and the second substrate SUB2, and the bonding layer of the first substrate SUB1 and the bonding layer of the second substrate SUB2 may be mutually bonded in the process of bonding the first substrate SUB1 and the second substrate SUB2.

Each of the pressure sensing cells CE1 to CEp includes a driving connection electrode TCE, a sensing connection electrode RCE, a first driving electrode TE1, a first sensing electrode RE1, and a first pressure sensing layer PSL1.

The driving connection electrode TCE, the sensing connection electrode RCE, the first driving electrode TE1, and the first sensing electrode RE1 are disposed on the first substrate SUB1 facing the second substrate SUB2.

The driving connection electrode TCE is connected to the driving line TL and the first driving electrode TE1. Specifically, the driving connection electrode TCE is connected to the driving line TL at both ends thereof in a length direction (X-axis direction). The first driving electrodes TE1 may branch off in a width direction (Y-axis direction) of the driving connection electrode TCE.

The sensing connection electrode RCE is connected to one among the sensing lines RL1 to RLp and the first sensing electrode RE1. Specifically, the sensing connection electrode RCE is connected to one among the sensing lines RL1 to RLp at one end thereof in the length direction (X-axis direction). The first sensing electrodes RE1 may branch off in a width direction (Y-axis direction) of the sensing connection electrode RCE.

The first driving electrode TE1 and the first sensing electrode RE1 may be disposed on the same layer. The first driving electrode TE1 and the first sensing electrode RE1 may be made of the same material. For example, each of the first driving electrode TE1 and the first sensing electrode RE1 may include a conductive material such as silver (Ag), copper (Cu), or the like. The first driving electrode TE1 and the first sensing electrode RE1 may be formed on the first substrate SUB1 through a screen-printing method.

The first driving electrodes TE1 and the first sensing electrodes RE1 are disposed adjacent to each other but are not connected to each other. The first driving electrodes TE1 may be disposed parallel to the first sensing electrodes REL. The first driving electrodes TE1 and the first sensing electrodes RE1 may be alternately disposed in the length direction (X-axis direction) of the driving connection electrode TCE and the sensing connection electrode RCE. That is, it may be repeatedly disposed in the order of the first driving electrode TE1, the first sensing electrode RE1, the first driving electrode TE1, and the first sensing electrode RE1 in the length direction (X-axis direction) of the driving connection electrode TCE and the sensing connection electrode RCE.

The first pressure sensing layer PSL1 is disposed on one surface of the second substrate SUB2 that faces the first substrate SUB1. The first pressure sensing layer PSL1 may be disposed to overlap the first driving electrodes TE1 and the first sensing electrodes RE1.

The first pressure sensing layer PSL1 may include a pressure-sensitive material and polymer resin on which the pressure-sensitive material is disposed. The pressure-sensitive material may be metal microparticles (or metal nanoparticles) of nickel, aluminum, titanium, tin, copper, and the like. For example, the first pressure sensing layer PSL1 may be a quantum tunneling composite (QTC).

When pressure is not applied to the second substrate SUB2 in a height direction (Z-axis direction) of the first pressure sensor 510, a gap is present between the first pressure sensing layer PSL1 and the first driving electrodes TE1 and between the first pressure sensing layer PSL1 and the first sensing electrodes RE1. That is, when pressure is not applied to the second substrate SUB2, the first pressure sensing layer PSL1 is spaced apart from the first driving electrodes TE1 and the first sensing electrodes RE1.

When pressure is applied to the second substrate SUB2 in the height direction (Z-axis direction) of the first pressure sensor 510, the first pressure sensing layer PSL1 comes into contact with the first driving electrodes TE1 and the first sensing electrodes RE1. Thus, the first driving electrode TE1 and the first sensing electrode RE1 may be physically connected through the first pressure sensing layer PSL1, and the first pressure sensing layer PSL1 may act as an electrical resistor.

Hereinafter, the structure in which the above-described first pressure sensor 510 is embedded in the bracket side portion 800a of the lower bracket 800 will be described in detail.

Figure 9:
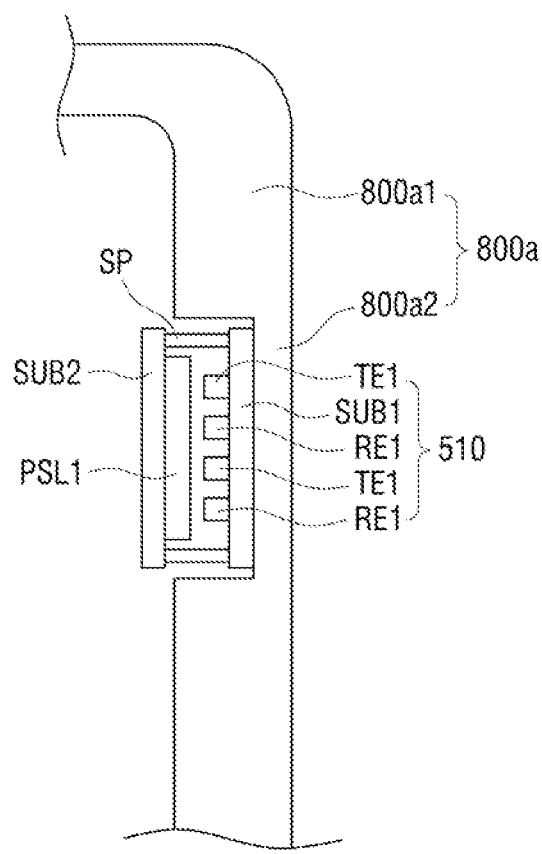
FIGS. 9 and 10 are cross-sectional views illustrating an example of a case in which a user does not press the pressure sensor with a hand and a case in which the user presses the pressure sensor with the hand.
Figure 10:
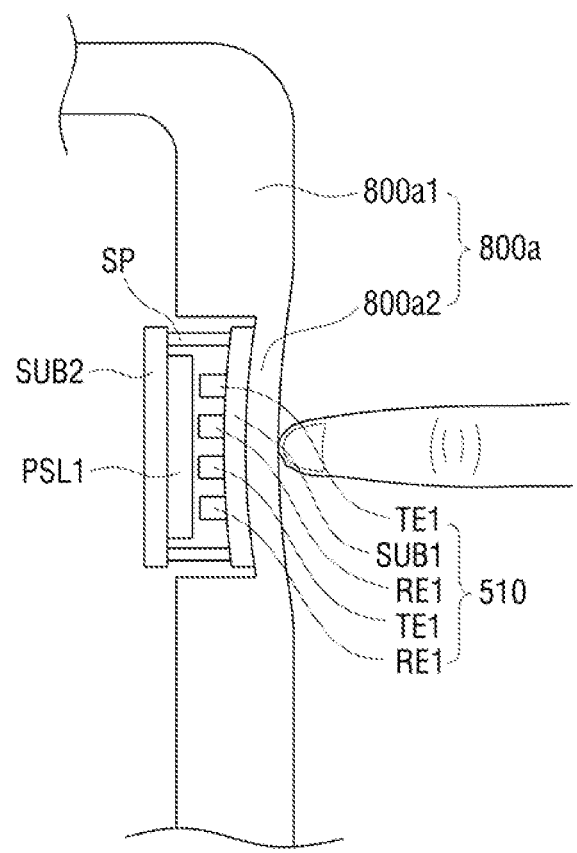

FIGS. 9 and 10 are cross-sectional views illustrating an example of a case in which a user does not press the pressure sensor with a hand and a case in which the user presses the pressure sensor with the hand.

Referring to FIGS. 9 and 10, the case in which the above-described first pressure sensor 510 is embedded in the bracket side portion 800M of the lower bracket 800 is described. As shown in FIG. 9, the first substrate SUB1 may be disposed on the second sub-side portion 800a2 of the bracket side portion 800a. That is, the first substrate SUB1 may be disposed on the first surface of the second sub-side portion 800a2. Although not shown in the drawings, a pressure sensor coupling member may be further disposed between the first substrate SUB1 and the first surface of the second sub-side portion 800a2. The pressure sensor coupling member may serve to couple the first substrate SUB1 and the first surface of the second sub-side portion 800a2 to each other.

The first driving electrode TE1 and the first sensing electrode RE1 may be disposed on the first substrate SUB1. As described above, the first driving electrode TE1 and the first sensing electrode RE1 may be spaced apart from each other and may be alternately arranged along one direction. The first driving electrode TE1 and the first sensing electrode RE1 may be formed on the first substrate SUB1 through a screen-printing method.

A first pressure sensing layer PSL1 may be disposed above the first driving electrode TE1 and the first sensing electrode RE1. That is, the first driving electrode TE1 and the first sensing electrode RE1 may be disposed between the first pressure sensing layer PSL1 and the first substrate SUB1.

When pressure is not applied to the first substrate SUB1 in a direction of the bracket side portion 800a of the first pressure sensor 510, a gap is present between the first pressure sensing layer PSL1 and the first driving electrodes TE1 and between the first pressure sensing layer PSL1 and the first sensing electrodes RE1. That is, when pressure is not applied to the first substrate SUB2, the first pressure sensing layer PSL1 is spaced apart from the first driving electrodes TE1 and the first sensing electrodes RE1.

The second substrate SUB2 may be disposed on the first pressure sensing layer PSL1. The second substrate SUB2 may be opposite to the first substrate SUB1. That is, the first pressure sensing layer PSL1 may be disposed between the second substrate SUB2, and the first driving electrode TE1 and the first sensing electrode RE1. The first pressure sensing layer PSL1 may be disposed directly on one surface of the second substrate SUB2 that faces the first substrate SUB1.

When pressure is applied to the second substrate SUB1 in a direction toward the bracket side portion 800M of the first pressure sensor 510, as shown in FIG. 10, the first driving electrodes TE1 and the first sensing electrodes RE1 are brought into contact with the first pressure sensing layer PSL1. Thus, the first driving electrode TE1 and the first sensing electrode RE1 may be physically connected through the first pressure sensing layer PSL1, and the first pressure sensing layer PSL1 may act as an electrical resistor.

In one embodiment, since the first substrate SUB1 is attached to the bracket side portion 800a of the lower bracket 800, when pressure is applied in the direction toward the bracket side portion 800a of the first pressure sensor 510, the first substrate SUB1 moves inward together with the first driving electrode TE1 and the first sensing electrode RE1, but the second substrate SUB2 might not substantially move inward. That is, when the second substrate SUB2 moves inward along with the movement of the first substrate SUB1, the first driving electrode TE1, and the first sensing electrode RE1, even when pressure is applied through the bracket side portion 800a, a contact area between the first driving electrode TE1 and the first sensing electrode RE1, and the first pressure sensing layer PSL1 may be reduced.

In addition, when pressure is applied to the first substrate SUB1 in the direction toward the bracket side portion 800a of the first pressure sensor 510, physical damage may be generated on the second substrate SUB2 due to the pressure.

Thus, the first substrate SUB1 and the second substrate SUB2 may have different constituent materials. That is, the second substrate SUB2 may further include a rigid material than the first substrate SUB1.

For example, each of the first substrate SUB1 and the second substrate SUB2 may include a polyethylene-based material, a polyimide-based material, a polycarbonate-based material, a polysulfone-based material, a polyacrylate-based material, a polystyrene-based material, a polyvinyl chloride-based material, a polyvinyl alcohol-based material, a polynorbonene-based material, or a polyester-based material. In one embodiment, each of the first substrate SUB1 and the second substrate SUB2 may include a polyethylene terephthalate (PET) film or a polyimide film.

Examples of the rigid material include a thermosetting resin such as an epoxy resin, a polyether ketone-based thermoplastic resin, a reinforcing material such as a stiffener, stainless steel, and the like. That is, the first substrate SUB1 may further include at least one of the above-exemplified materials of the rigid material.

Accordingly, when pressure is applied through the bracket side portion 800a, a phenomenon in which the second substrate SUB2 is pushed inward by the pressure may be prevented, and further, physical damage may be prevented in advance.

Hereinafter, other embodiments of the display device 1 according to one embodiment will be described. In the following embodiments, the same reference numerals will be assigned to components that are the same as the above-described components, and duplicate descriptions thereof will be omitted or simplified herein.

Figure 11:
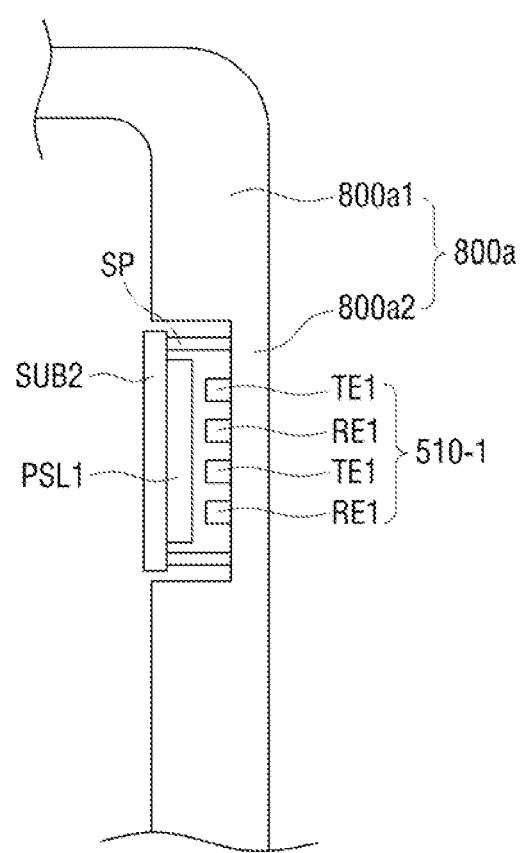
FIG. 11 is a cross-sectional view illustrating an example of a case in which a user does not press a pressure sensor with a hand according to another embodiment.

FIG. 11 is a cross-sectional view illustrating an example of a case in which a user does not press a pressure sensor with a hand according to another embodiment.

Referring to FIG. 11, a first pressure sensor 510_1 of a display device according to the present embodiment is different from that in the embodiment according to FIG. 9 in that a first driving electrode TE1 and a first sensing electrode RE1 may be directly formed on a second sub-side portion 800a2 of a lower bracket 800 and directly embedded in the lower bracket 800.

More specifically, the first driving electrode TE1 and the first sensing electrode RE1 according to the present embodiment may be directly formed on the second sub-side portion 800a2 of the lower bracket 800. For example, as described above, the first driving electrode TE1 and the first sensing electrode RE1 may be formed directly on the second sub-side portion 800a2 of the lower bracket 800 through a screen-printing method.

Figure 12:
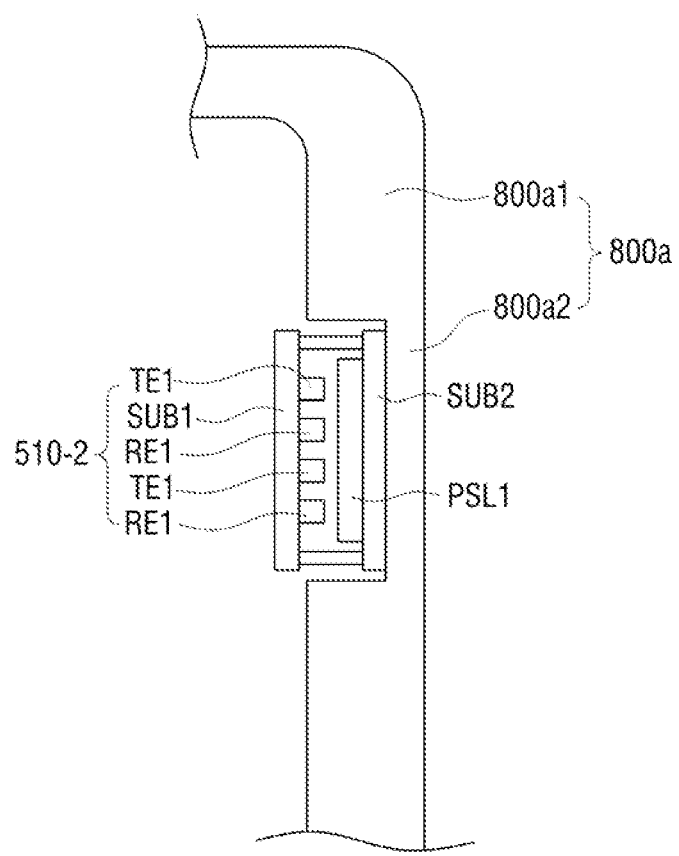
FIG. 12 is a cross-sectional view illustrating an example of a case in which a user does not press a pressure sensor with a hand according to still another embodiment.

FIG. 12 is a cross-sectional view illustrating an example of a case in which a user does not press a pressure sensor with a hand according to still another embodiment.

A first pressure sensor 5102 of a display device according to the present embodiment is different from that in the embodiment described above with reference to FIG. 9 in that the first pressure sensor 510_2 is mounted with left and right sides reversed on a lower bracket 800.

More specifically, a second substrate SUB2 may be disposed on a second sub-side portion 800a2 of the lower bracket 800, a first pressure sensing layer PSL1 may be disposed between the second substrate SUB2 and the second sub-side portion 800a2, a first substrate SUB1 may be disposed to face the second substrate SUB2, and a first driving electrode TE1 and a first sensing electrode RE1 may be disposed between the first substrate SUB1 and the first pressure sensing layer PSL1. That is, the second substrate SUB2 may be disposed directly on a first surface of the second sub-side portion 800a2.

Figure 13:
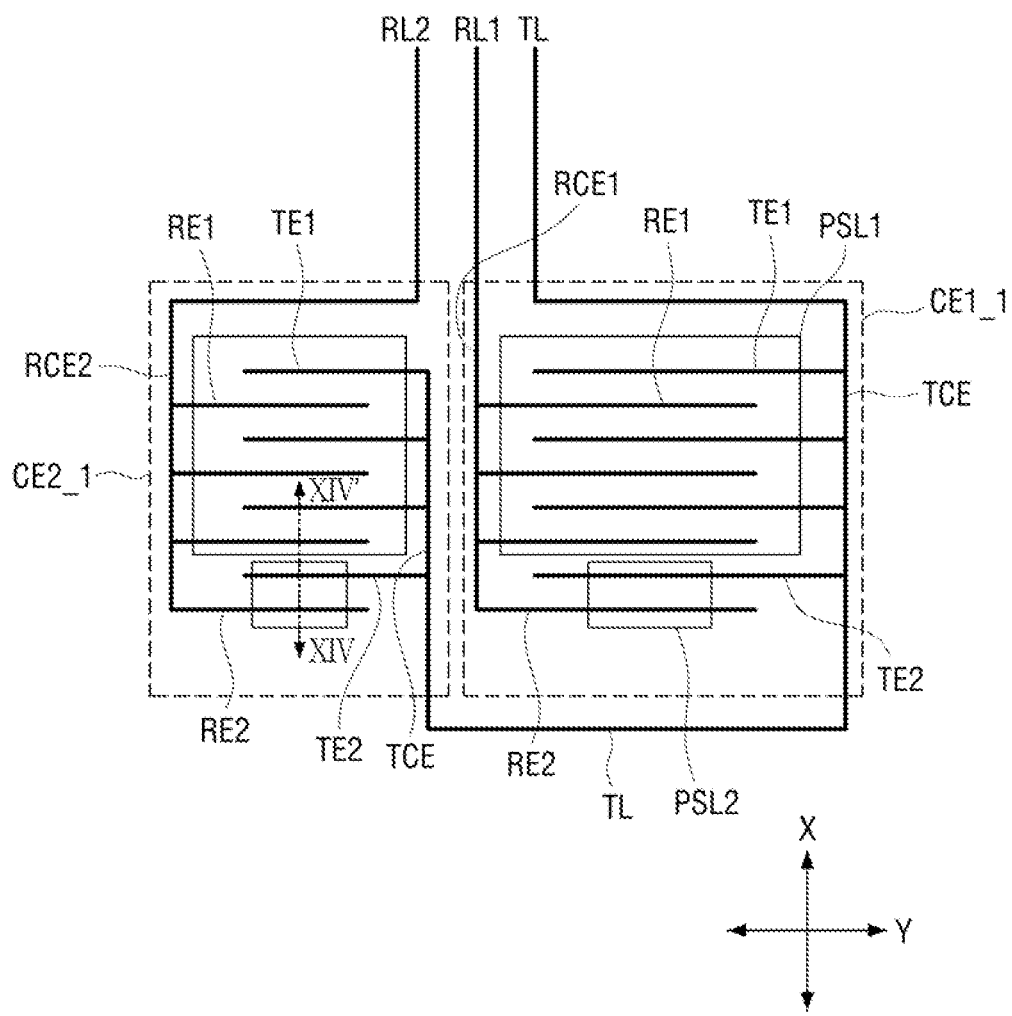
FIG. 13 is a plan view illustrating a pressure sensor according to another embodiment.
Figure 14:
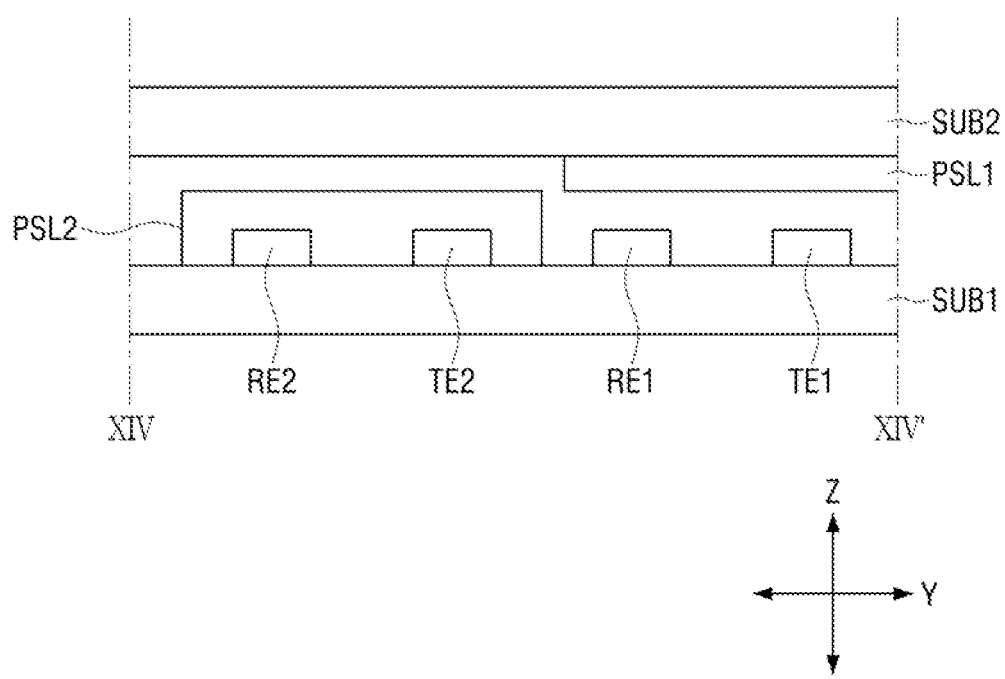
FIG. 14 is a cross-sectional view taken along line XIV-XIV' of FIG. 13.
Figure 15:
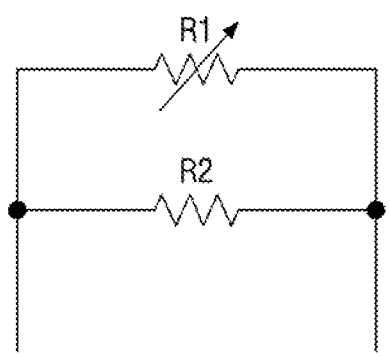
FIG. 15 is a circuit diagram illustrating the pressure sensor of FIG. 13.

FIG. 13 is a plan view illustrating a pressure sensor according to another embodiment, FIG. 14 is a cross-sectional view taken along line XIV-XIV' of FIG. 13, and FIG. 15 is a circuit diagram illustrating the pressure sensor of FIG. 13. The embodiment described with reference to FIGS. 13 and 14 illustrates that a first pressure sensor 510 includes only a first pressure sensing cell CE1 and a second pressure sensing cell CE2, but the present invention is not necessarily limited thereto, and it is obvious that the first pressure sensor 510 may include a plurality of pressure sensing cells CE1 to CEp.

Referring to FIGS. 13 to 15, there is a difference from the embodiment according to FIG. 7 in that each of the pressure sensing cells CE1 to CEp further includes a second driving electrode TE2, a second sensing electrode RE2, and a second pressure sensing layer RPL2.

More specifically, the second driving electrode TE2 and the second sensing electrode RE2 are disposed on one surface of a first substrate SUB1 facing a second substrate SUB2. In FIGS. 13 and 14, one second driving electrode TE2 and one second sensing electrode RE2 are illustrated, but the embodiment shown in FIGS. 13 and 14 is not necessarily limited thereto. That is, a plurality of second driving electrodes TE2 and a plurality of second sensing electrodes RE2 may be disposed on one surface of the first substrate SUB1 facing the second substrate SUB2.

The second driving electrodes TE2 may branch off in a width direction (Y-axis direction) of a driving connection electrode TCE. The second driving electrode TE2 may be disposed parallel to the first driving electrode TEL.

The second sensing electrodes RE2 may branch off in the width direction (Y-axis direction) of the sensing connection electrode RCE. The second sensing electrode RE2 may be disposed parallel to the first sensing electrode RE1.

The second driving electrode TE2 and the second sensing electrode RE2 may be disposed on the same layer as the first driving electrode TE1 and the first sensing electrode RE1. The second driving electrode TE2 and the second sensing electrode RE2 may be made of the same material as the first driving electrode TE1 and the first sensing electrode RE1. For example, each of the second driving electrode TE2 and the second sensing electrode RE2 may include a conductive material such as silver (Ag), copper (Cu), or the like. The second driving electrode TE2 and the second sensing electrode RE2 may be formed on the first substrate SUB1 through a screen-printing method.

The second driving electrode TE2 and the second sensing electrode RE2 are disposed adjacent to each other but are not connected to each other. The second driving electrode TE2 may be disposed parallel to the second sensing electrode RE2.

The second driving electrode TE2 and the second sensing electrode RE2 might not overlap the first pressure sensing layer PSL1. The second sensing electrode RE2 may be disposed between the second driving electrode TE2 and the first driving electrode TE1. In this case, a distance between the second driving electrode TE2 and the second sensing electrode RE2 may be less than a distance between the first driving electrode TE1 and the second sensing electrode RE2.

The second pressure sensing layer PSL2 may be in contact with the second driving electrode TE2 and the second sensing electrode RE2. That is, the second driving electrode TE2 and the second sensing electrode RE2 may be connected through the second pressure sensing layer PSL2.

As shown in FIG. 14, the second pressure sensing layer PSL2 may be disposed to cover the second driving electrode TE2 and the second sensing electrode RE2. The second pressure sensing layer PSL2 may be disposed to cover upper surfaces and side surfaces of the second driving electrode TE2 and the second sensing electrode RE2. The second pressure sensing layer PSL2 might not overlap the first pressure sensing layer PSL1.

The second pressure sensing layer PSL2 may be formed of the same material as the first pressure sensing layer PSL1. In this case, the second pressure sensing layer PSL2 may include a pressure-sensitive material and a polymer resin on which the pressure-sensitive material is disposed. The pressure-sensitive material may be metal microparticles of nickel, aluminum, titanium, tin, copper, and the like. For example, the second pressure sensing layer PSL2 may be a QTC.

As shown in FIG. 7, a first pressure sensing cell CE1_1 may be expressed as including a first resistor R1 and a second resistor R2 that are connected in parallel between the driving line TL and the first sensing line RL1. The first resistor R1 refers to a resistor generated due to the first pressure sensing layer PSL1 disposed between the first driving electrodes TE1 and the first sensing electrodes RE1, and the second resistor R2 refers to a resistor generated due to the second pressure sensing layer PSL2 disposed between the second driving electrode TE2 and the second sensing electrode RE2. Since a contact area of the first pressure sensing layer PSL1 in contact with the first driving electrodes TE1 and the first sensing electrodes RE1 is varied according to pressure, the first resistor R1 corresponds to a variable resistor.

According to the embodiment described with reference to FIGS. 13 to 15, each of the first and second pressure sensing cells CE1_1 and CE2_1 may include the first resistor R1 having resistance variable according to the pressure applied by the first pressure sensing layer PSL1, and the second resistor R2 defined by the second pressure sensing layer PSL2 in contact with the second driving electrode TE2 and the second sensing electrode RE2. That is, since each of the first and second pressure sensing cells CE1_1 and CE2_1 includes the second resistor R2 irrespective of the applied pressure, the resistance of a resistor R of each of the first and second pressure sensing cells CE1_1 and CE2_1 may be decreased.

Meanwhile, the second driving electrode TE2 and the second sensing electrode RE2 are electrodes that are connected to the second pressure sensing layer PSL2 to form the second resistor R2, and thus the number of second driving electrodes TE2 and the number of second sensing electrodes RE2 do not need to be large. On the other hand, since the first driving electrode TE1 and the first sensing electrode RE1 are electrodes that sense a pressure according to an area in contact with the first pressure sensing layer PSL1, it is preferable that a plurality of first driving electrodes TE1 and a plurality of first sensing electrodes RE1 are formed. The number of second driving electrodes TE2 may be smaller than the number of first driving electrodes TE1, and the number of second sensing electrodes RE2 may be smaller than the number of first sensing electrodes RE1.

In addition, as a thickness of the second driving electrode TE2 and a thickness of the second sensing electrode RE2 become greater, the resistance of the second resistor R2 may become smaller. In addition, as a width of the second driving electrode TE2 and a width of the second sensing electrode RE2 become greater, the resistance of the second resistor R2 may become smaller. In addition, as the number of second driving electrodes TE2 and the number of second sensing electrodes RE2 in contact with the second pressure sensing layer PSL2 increase, the contact area between the second pressure sensing layer PSL2 and the second driving electrodes TE2 and the contact area between the second pressure sensing layer PSL2 and the second sensing electrodes RE2 increase so that the resistance of the second resistor R2 may become smaller. In addition, as the area of the second pressure sensing layer PSL2 in contact with the second driving electrode TE2 and the second sensing electrode RE2 increases, the resistance of the second resistor R2 may become smaller. Thus, a size of the second resistor R2 may be designed in consideration of the thickness of the second driving electrode TE, the thickness of the second sensing electrode RE2, the width of the second driving electrode TE, the width of the second sensing electrode RE2, the number of second driving electrodes TE2, the number of second sensing electrodes RE2, and the area of the second pressure sensing layer PSL2 in contact with the second driving electrode TE2 and the second sensing electrode RE2.

Figure 16:
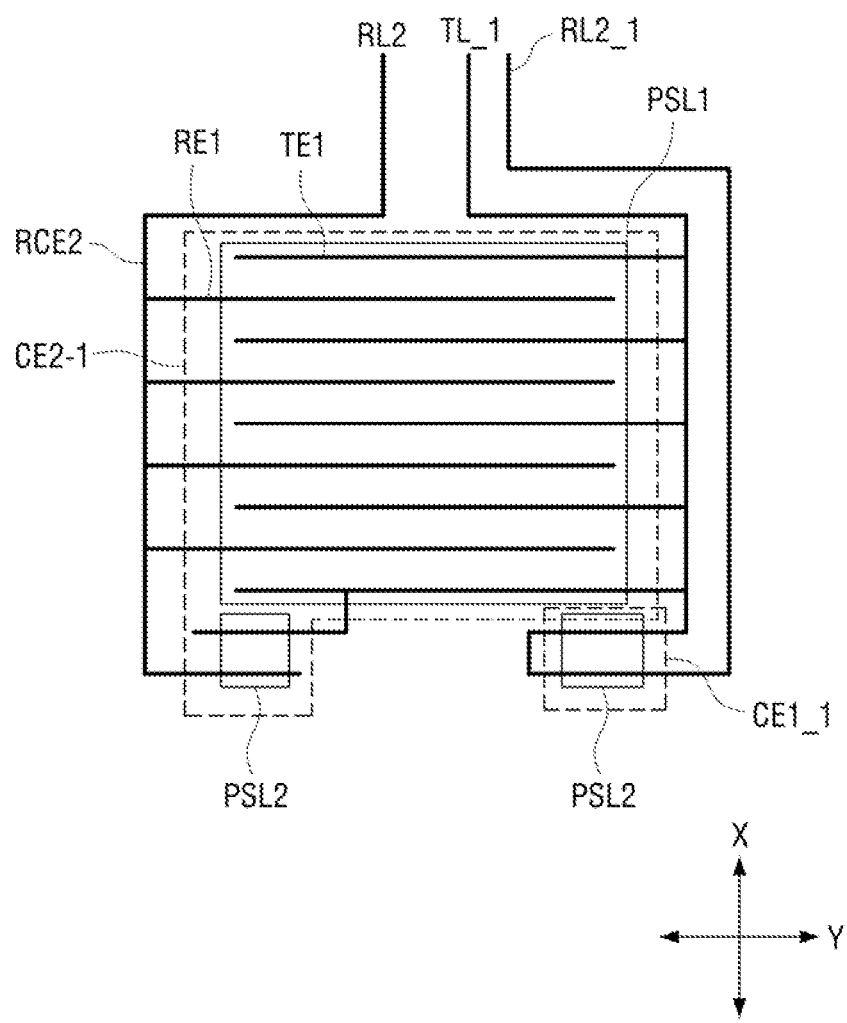
FIG. 16 is a plan view illustrating a pressure sensor according to still another embodiment.

FIG. 16 is a plan view illustrating a pressure sensor according to still another embodiment.

Referring to FIG. 16, a first pressure sensor according to the present embodiment is different from that in the embodiment according to FIG. 13 in that an overall area occupied by the sensor is reduced.

More specifically, in the first pressure sensor according to the present embodiment, a driving line TL_1, a first pressure sensing cell CE1_2, and a second pressure sensing cell CE2_1 may be connected to each other, the first pressure sensing cell CEL_2 may include a first sensing line RL1_1 and a second pressure sensing layer PSL2 in contact with a first driving electrode branched from the driving line TL_1, and the second pressure sensing cell CE2_1 may include a first sensing electrode RE1 of a second sensing line RL2 and a second pressure sensing layer PSL2 in contact with a second driving electrode branched from the driving line TL_1.

Each of the second pressure sensing layer PSL2 of the first pressure sensing cell CE1_2 and the second pressure sensing layer PSL2 of the second pressure sensing cell CE2_1 may be disposed to overlap the first pressure sensing layer PSL1 of the second pressure sensing cell CE2_1 in the first direction (X direction).

Figure 17:
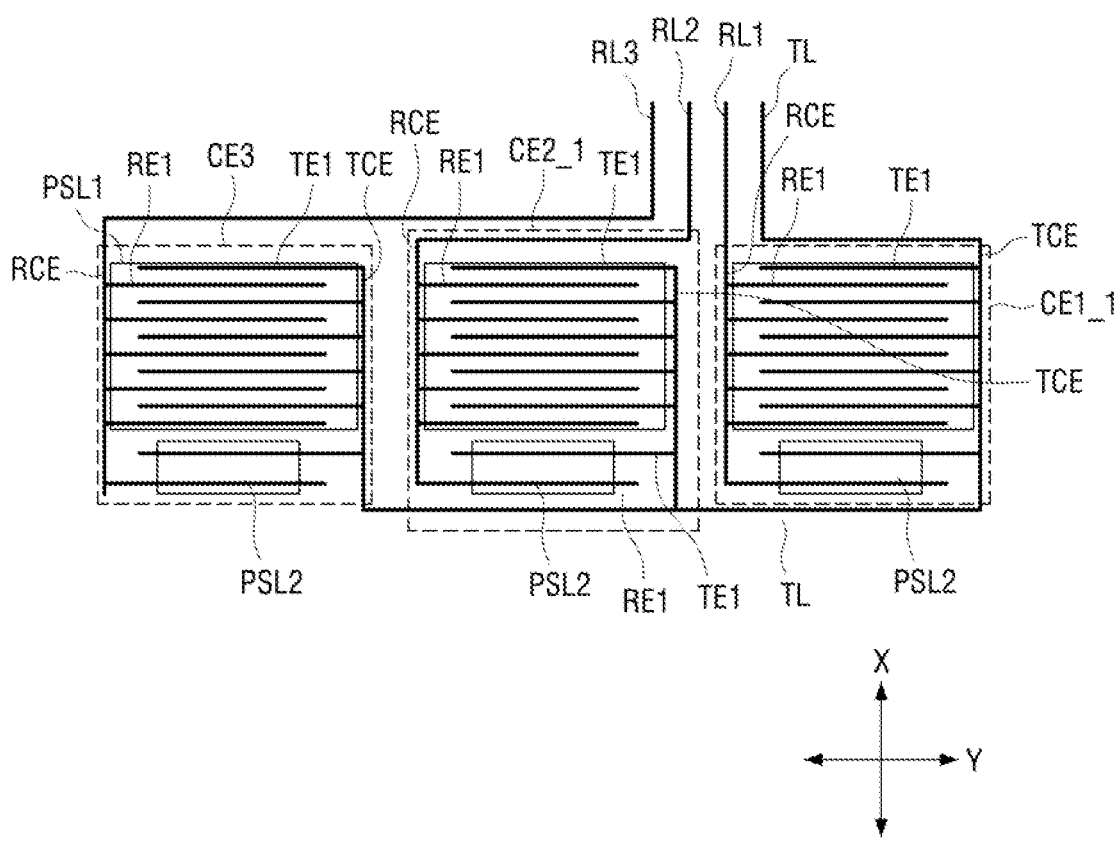
FIG. 17 is a plan view illustrating a pressure sensor according to yet another embodiment.

FIG. 17 is a plan view illustrating a pressure sensor according to yet another embodiment.

Referring to FIG. 17, a first pressure sensor according to the present embodiment is different from that in the embodiment shown in FIG. 13 in that the first pressure sensor includes three pressure sensing cells.

More specifically, the first pressure sensor according to the present embodiment may include a first pressure sensing cell CE1_1, a second pressure sensing cell CE2_1 located on a left side of the first pressure sensing cell CE1_1 in the second direction (Y direction), and a third pressure sensing cell CE3 located on a left side of the second pressure sensing cell CE2_1 in the second direction (Y direction). Like the first pressure sensing cell CE1_1, the third pressure sensing cell CE3 may include one driving electrode, one sensing electrode, and a first pressure sensing layer PSL1 that overlap the driving electrode and the sensing electrode. The first pressure sensing layer PSL1 of the third pressure sensing cell CE3 may be disposed to overlap a driving electrode connected to a driving line TL, and a first sensing electrode connected to a third sensing line RL3.

Figure 18:
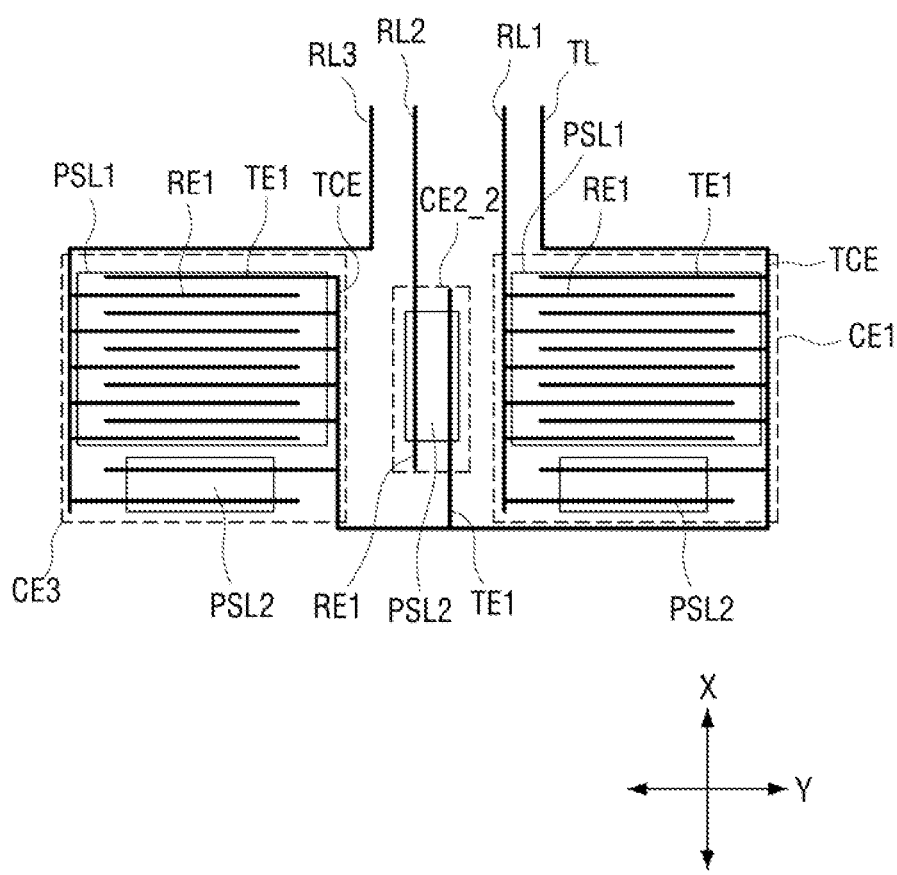
FIG. 18 is a plan view illustrating a pressure sensor according to yet another embodiment.

FIG. 18 is a plan view illustrating a pressure sensor according to yet another embodiment.

Referring to FIG. 18, a first pressure sensor according to the present embodiment is different from that in the embodiment according to FIG. 17 in that a second pressure sensing cell CE2_2 does not include a first pressure sensing layer PSL1.

More specifically, a second pressure sensing layer PSL2 of the second pressure sensing cell CE2_2 according to the present embodiment may be disposed between a first pressure sensing layer PSL1 of a first pressure sensing cell CE1_1 and a first pressure sensing layer PSL1 of a third pressure sensing cell CE3 so as to overlap the first pressure sensing layers PSL1 in the second direction (Y direction).

Figure 19:
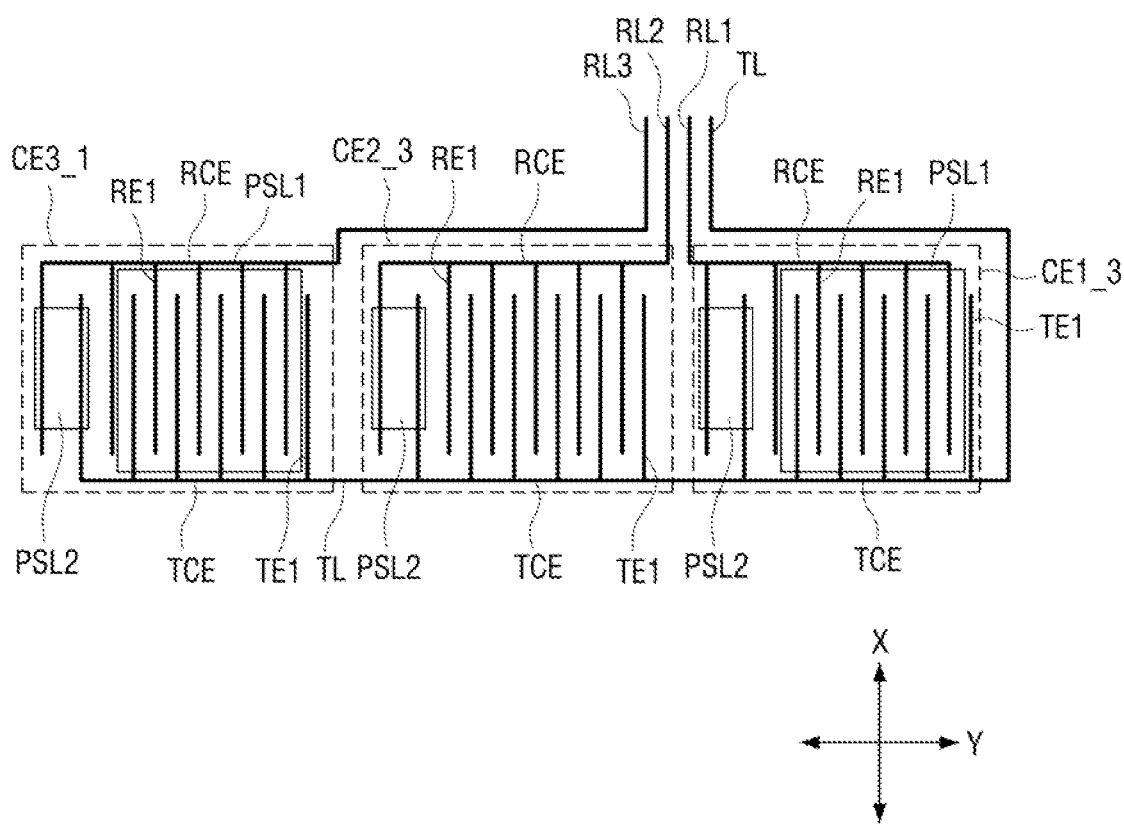
FIG. 19 is a plan view illustrating a pressure sensor according to yet another embodiment.

FIG. 19 is a plan view illustrating a pressure sensor according to yet another embodiment.

Referring to FIG. 19, a first pressure sensor according to the present embodiment is different from that in the embodiment according to FIG. 17 in that a pressure sensing cell includes a first pressure sensing layer PSL1 and a second pressure sensing layer PSL2 that are disposed in the second direction (Y direction), and a second pressure sensing cell CE2_3 does not include a first pressure sensing layer PSL1.

More specifically, in the first pressure sensor according to the present embodiment, the pressure sensing cell may include the first pressure sensing layer PSL1 and the second pressure sensing layer PSL2 that are disposed in the second direction (Y direction), and the second pressure sensing cell CE2_3 might not include the first pressure sensing layer PSL1.

Figure 20:
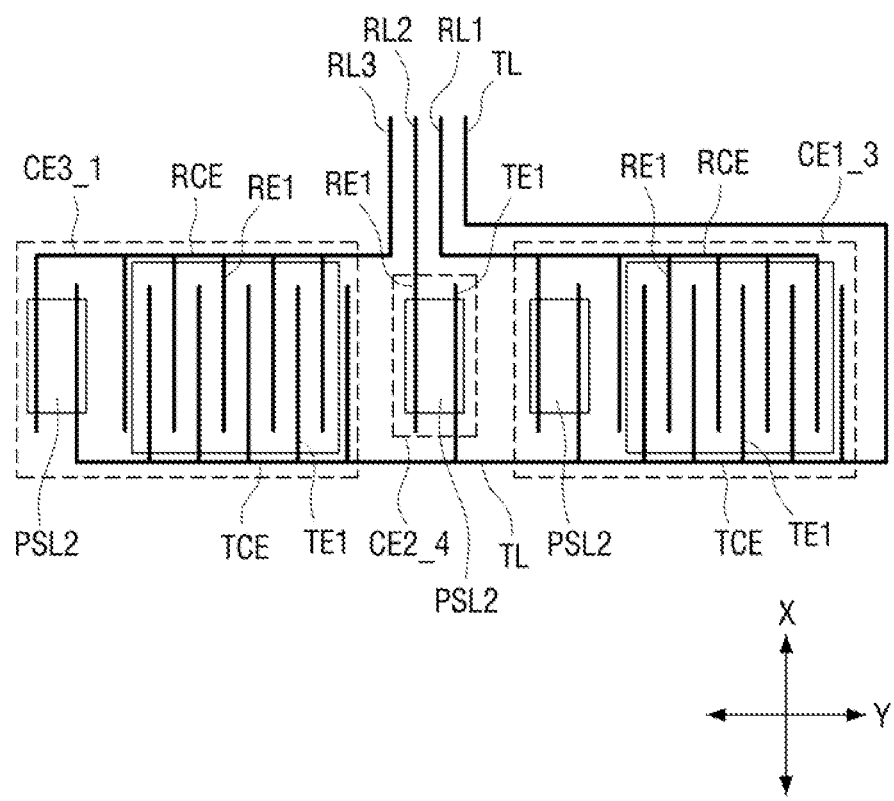
FIG. 20 is a plan view illustrating a pressure sensor according to yet another embodiment.

FIG. 20 is a plan view illustrating a pressure sensor according to yet another embodiment.

Referring to FIG. 20, a first pressure sensor according to the present embodiment is different from that in the embodiment according to FIG. 19 in that a second pressure sensing cell CE2_4 does not include an area in which a first pressure sensing layer PSL1 is not disposed.

More specifically, in the first pressure sensor according to the present embodiment, the second pressure sensing cell CE2_4 might not include an area in which the first pressure sensing layer PSL1 is not disposed. That is, a second pressure sensing layer PSL2 of the second pressure sensing cell CE2_4 may be interposed between a second pressure sensing layer PSL2 of a first pressure sensing cell CE_3 and a first pressure sensing layer PSL1 of a third pressure sensing cell CE3_1.

That is, the second pressure sensing layer PSL2 of the first pressure sensing cell CE1_3 may be disposed between the second pressure sensing layer PSL2 of the second pressure sensing cell CE2_4 and the first pressure sensing layer PSL1 of the first pressure sensing cell CE1_3.

Figure 21:
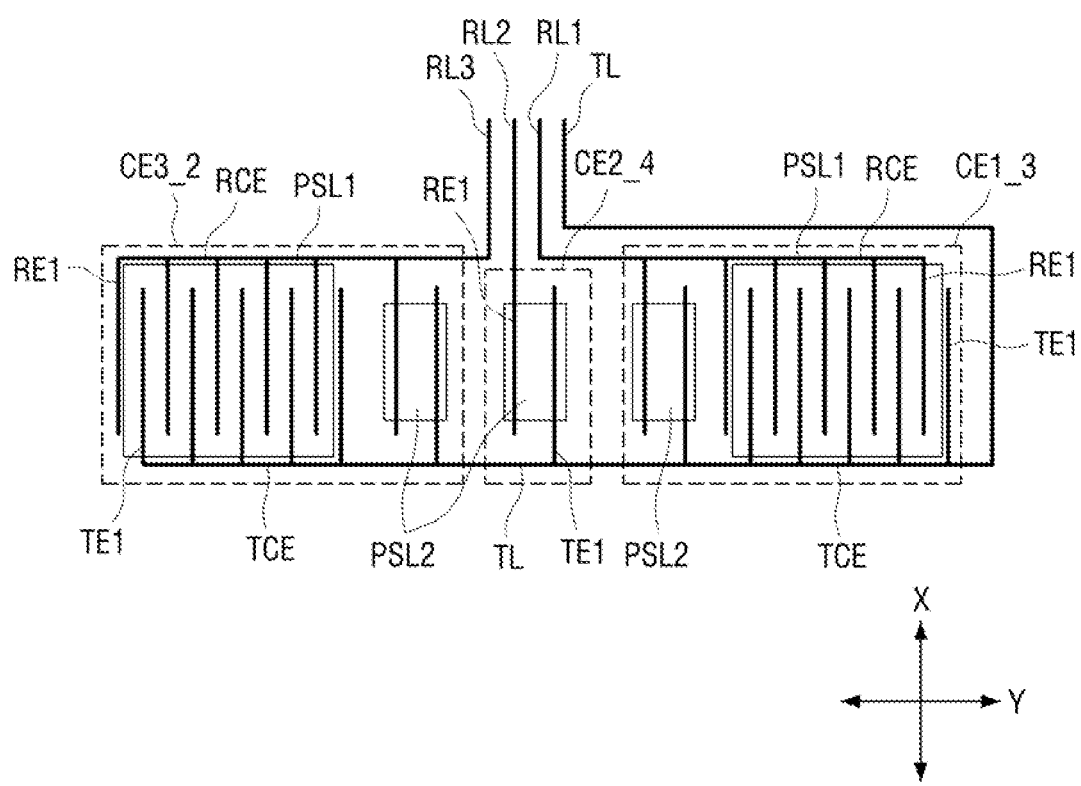
FIG. 21 is a plan view illustrating a pressure sensor according to yet another embodiment.

FIG. 21 is a plan view illustrating a pressure sensor according to yet another embodiment.

Referring to FIG. 21, in a first pressure sensor according to the present embodiment, a second pressure sensing layer PSL2 of a second pressure sensing cell CE2_4 may be interposed between a second pressure sensing layer PSL2 of a first pressure sensing cell CE1_3 and a second pressure sensing layer PSL2 of a third pressure sensing cell CE3_2.

That is, the second pressure sensing layer PSL2 of the first pressure sensing cell CE1_3 may be disposed between the first pressure sensing layer PSL1 of the first pressure sensing cell CE1_3 and the second pressure sensing layer PSL2 of the second pressure sensing cell CE2_4, and the second pressure sensing layer PSL2 of the third pressure sensing cell CE3_2 may be disposed between a first pressure sensing layer PSL1 of the third pressure sensing cell CE32 and the second pressure sensing layer PSL2 of the second pressure sensing cell CE2_4.

Figure 22:
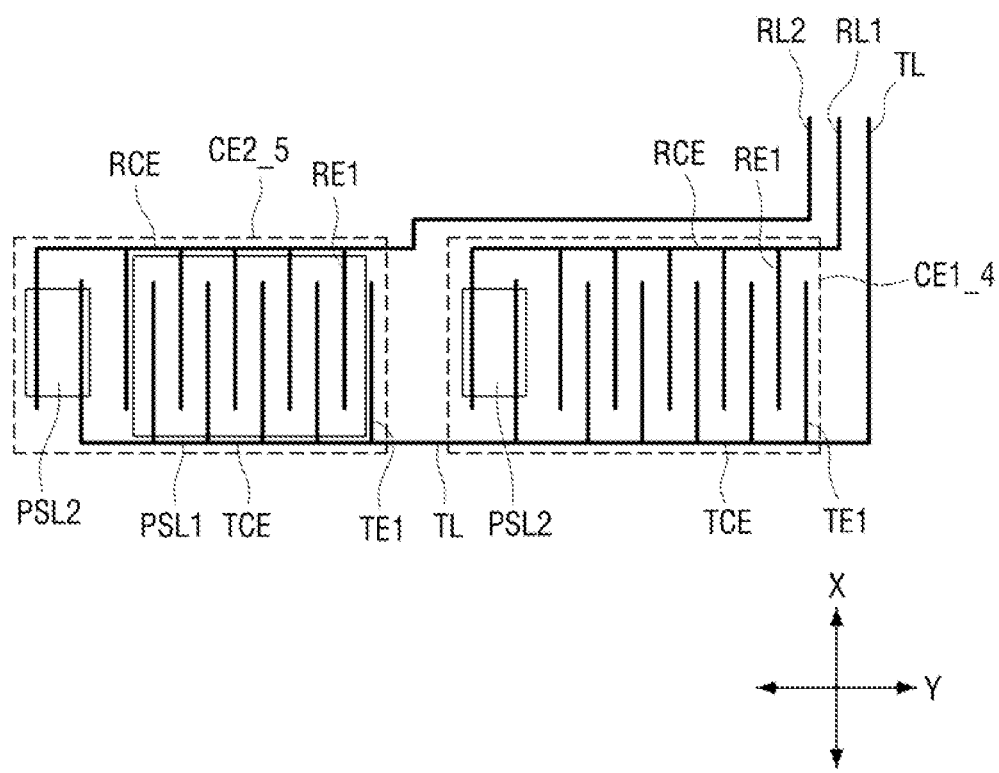
FIG. 22 is a plan view illustrating a pressure sensor according to yet another embodiment.

FIG. 22 is a plan view illustrating a pressure sensor according to yet another embodiment.

Referring to FIG. 22, a first pressure sensor according to the present embodiment is different from that in the embodiment according to FIG. 19 in that a first pressure sensing cell CE1_3 may be omitted from the embodiment according to FIG. 19. That is, a first pressure sensing cell CE1_4 according to the present embodiment is substantially the same as the second pressure sensing cell CE2_3 of FIG. 19, and a second pressure sensing cell CE2_5 may be substantially the same as the third pressure sensing cell CE3_1 of FIG. 19.

Figure 23:
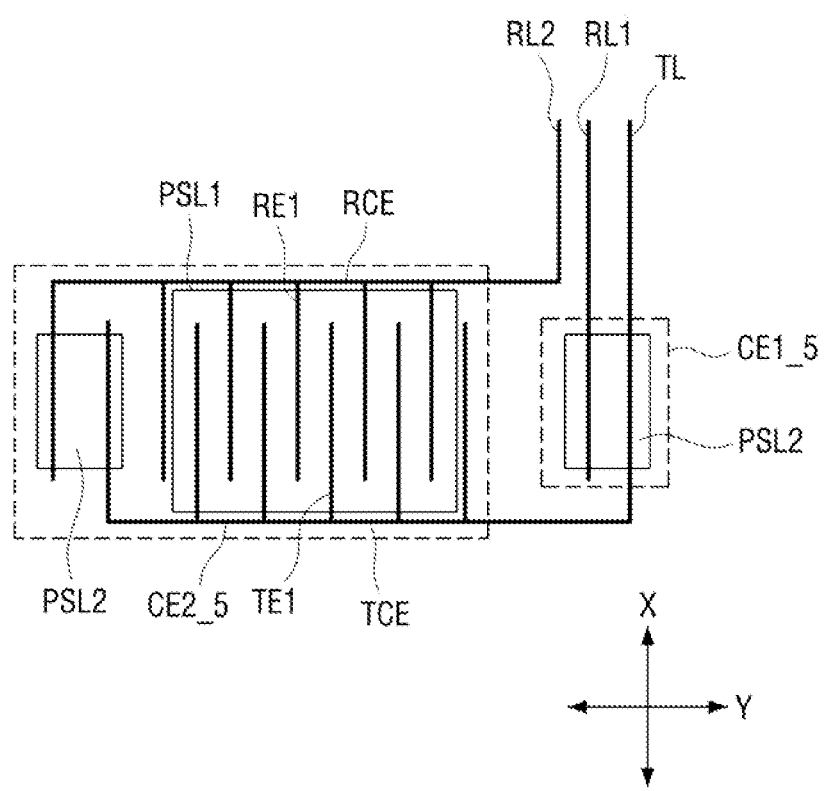
FIG. 23 is a plan view illustrating a pressure sensor according to yet another embodiment.

FIG. 23 is a plan view illustrating a pressure sensor according to yet another embodiment.

Referring to FIG. 23, a first pressure sensor according to the present embodiment is different from that in the embodiment according to FIG. 22 in that an area in which a first pressure sensing layer PSL1 of a first pressure sensing cell CE1_4 is not disposed may be omitted.

Figure 24:
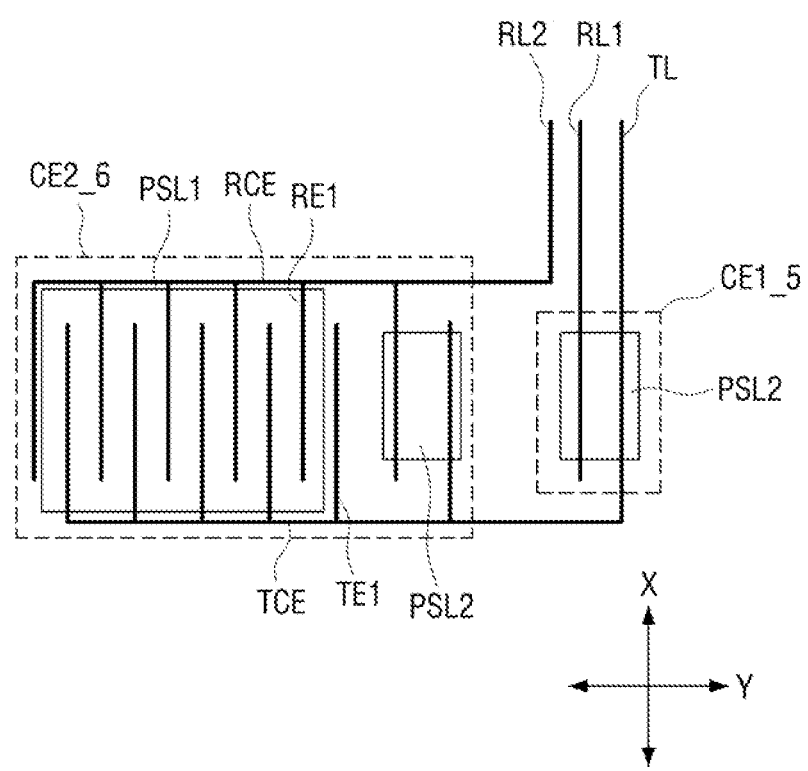
FIG. 24 is a plan view illustrating a pressure sensor according to yet another embodiment.

FIG. 24 is a plan view illustrating a pressure sensor according to yet another embodiment.

Referring to FIG. 24, a first pressure sensor according to the present embodiment is different from that in the embodiment according to FIG. 23 in that a second pressure sensing layer PSL2 of a second pressure sensing cell CE2_6 is disposed between a second pressure sensing layer PSL2 of a first pressure sensing cell CE1_5 and a first pressure sensing layer PSL1 of a second pressure sensing cell CE2_6.

Figure 25:
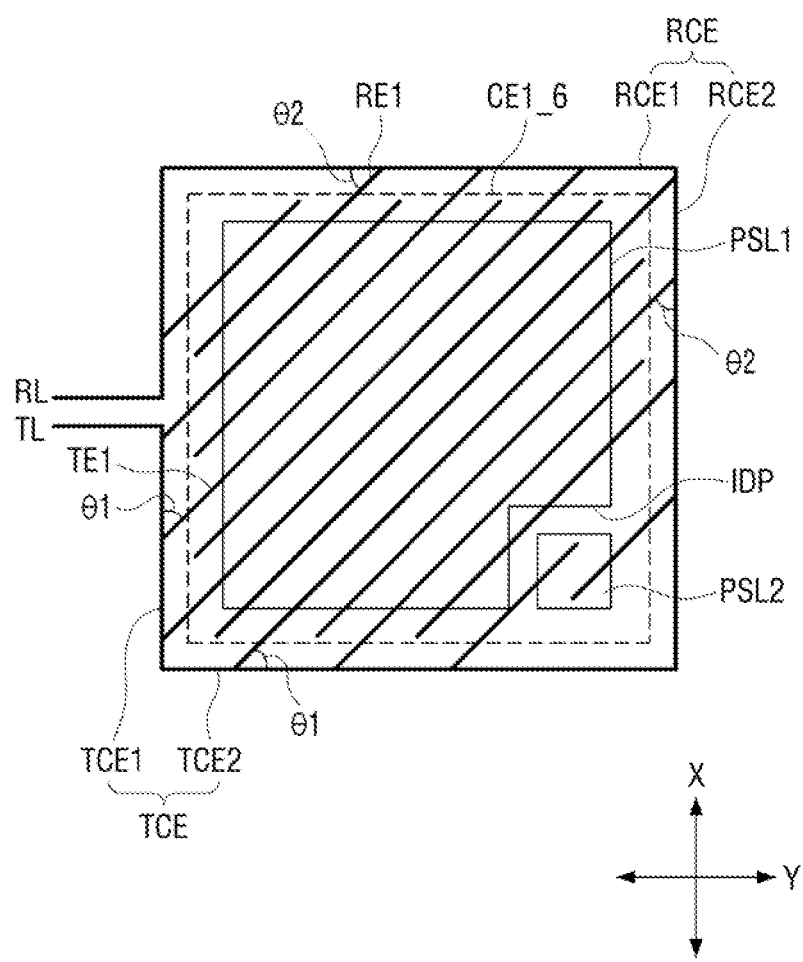
FIG. 25 is a plan view illustrating a pressure sensor according to yet another embodiment.

FIG. 25 is a plan view illustrating a pressure sensor according to yet another embodiment.

Referring to FIG. 25, in a first pressure sensor according to the present embodiment, only one pressure sensing cell, for example, a first pressure sensing cell CE1_6, is illustrated, and there is a difference from the embodiment according to FIG. 13 in that a first pressure sensing layer PSL1 of the first pressure sensing cell CE1_6 has a recessed pattern IDP, and a second pressure sensing layer PSL2 of the first pressure sensing cell CE1_6 is disposed in an area of the recessed pattern IDP of the first pressure sensing layer PSL1. That is, the embodiment according to FIG. 25 illustrates that the cell area may be reduced.

More specifically, the first pressure sensing layer PSL1 of the first pressure sensing cell CE1_6 has the recessed pattern IDP, and the second pressure sensing layer PSL2 of the first pressure sensing cell CE1_6 may be disposed in the area of the recessed pattern IDP of the first pressure sensing layer PSL1.

In addition, a sensing connection electrode RCE may include a first sub-sensing connection electrode RCE1 extending along the second direction (Y direction) and a second sub-sensing connection electrode RCE2 bent in the first direction (X direction) from the first sub-sensing connection electrode RCE1. In addition, a driving connection electrode TCE may include a first sub-driving connection electrode TCE1 extending along the first direction (X direction) and a second sub-driving connection electrode TCE2 bent in the second direction (Y direction) from the first sub-driving connection electrode TCE1.

A first sensing electrode RE1 and a first driving electrode TE1 may be branched from the sub-driving connection electrodes and the sub-sensing connection electrodes, respectively. As shown in FIG. 25, each of the first driving electrode TE1 and the first sensing electrode RE1 may extend in one direction between the first direction (X direction) and the second direction (Y direction), and an extending direction of each of the first driving electrode TE1 and the first sensing electrode RE1 may be parallel to each other without crossing each other.

Figure 26:
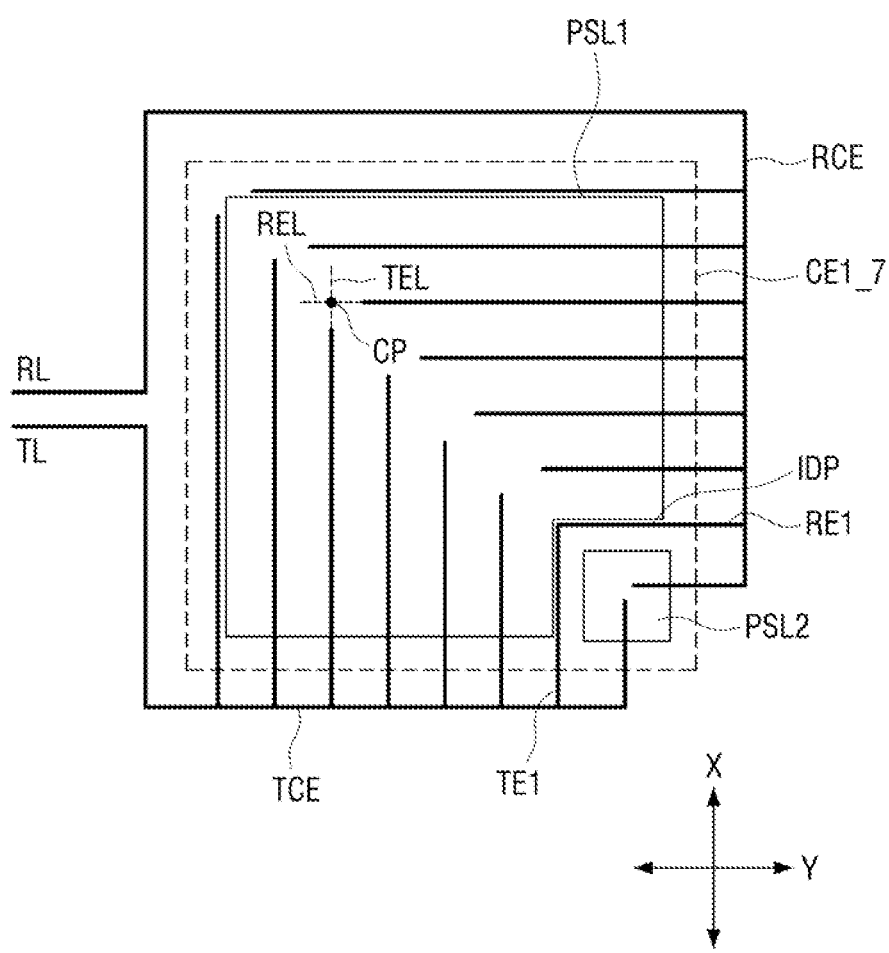
FIG. 26 is a plan view illustrating a pressure sensor according to yet another embodiment.

FIG. 26 is a plan view illustrating a pressure sensor according to yet another embodiment.

Referring to FIG. 26, a first pressure sensor according to the present embodiment is different from that in the embodiment according to FIG. 25 in that extending directions of a first driving electrode TE1 and a first sensing electrode RE1 cross each other.

More specifically, a first extension line TEL extending along the extending direction of the first driving electrode TE1 and a second extension line REL extending along the extending direction of the first sensing electrode RE1 may cross each other at a point extending to each other.

Figure 27:
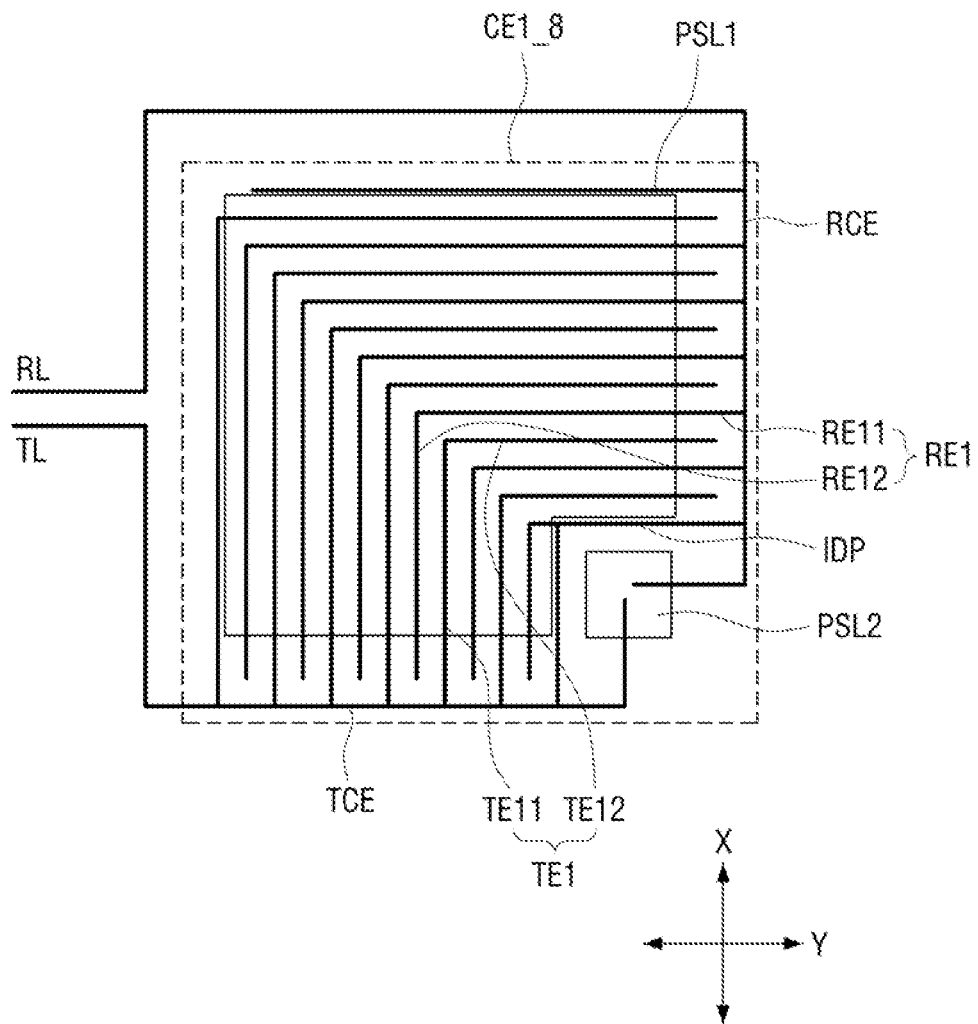
FIG. 27 is a plan view illustrating a pressure sensor according to yet another embodiment.

FIG. 27 is a plan view illustrating a pressure sensor according to yet another embodiment.

Referring to FIG. 27, a first pressure sensor according to the present embodiment is different from that in the embodiment according to FIG. 25 in that each of a first driving electrode TE1 and a first sensing electrode RE1 include a bent portion.

More specifically, the first driving electrode TE1 according to the present embodiment may include a first sub-driving electrode TE11 branched from a driving connection electrode TCE and extending in the first direction (X direction) and a second sub-driving electrode TE12 extending in the second direction (Y direction) from the first sub-driving electrode TE11, and the first sensing electrode RE1 may include a first sub-sensing electrode RE11 branched from a sensing connection electrode RCE and extending in the second direction (Y direction) and a second sub-sensing electrode RE12 extending along the first direction (X direction) from the first sub-sensing electrode RE11.

The first driving electrode TE1 may be disposed parallel to the first sensing electrode RE1. That is, the first sub-driving electrode TE11 of the first driving electrode TE1 and the second sub-sensing electrode RE12 of the first sensing electrode RE1 may be disposed parallel to each other, and the second sub-driving electrode TE12 of the first driving electrode TE1 and the first sub-sensing electrode RE11 of the first sensing electrode RE1 may be disposed parallel to each other.

Although embodiments of the invention have been disclosed for illustrative purposes, those skilled in the art will appreciate that various modifications, additions and substitutions are possible, without departing from the scope and spirit of the invention.

The invention claimed is:

1. A display device, comprising:
a display panel including a first side surface and a first lower surface that is connected to the first side surface, the first lower surface being arranged opposite to a display surface of the display panel;
a pressure sensor disposed on the first lower surface of the display panel; and
a lower bracket including a second lower surface facing the first lower surface of the display panel and a second side surface facing the first side surface of the display panel,
wherein the pressure sensor is disposed between the first lower surface of the display panel and the second lower surface of the lower bracket and the pressure sensor is disposed on the second side surface of the lower bracket,
wherein the pressure sensor includes a first substrate facing the second side surface of the lower bracket, a first pressure sensing layer disposed between the first substrate and the second side surface of the lower bracket, a first driving electrode disposed between the first pressure sensing layer and the second side surface of the lower bracket, and a first sensing electrode spaced apart from the first driving electrode, wherein the first sensing electrode and the first driving electrode occupy a shared horizontal plane, that is parallel to a bottom surface of the first substrate in a cross-sectional view, and a gap is present between a horizontal plane of the first pressure sensing layer, that is parallel to a bottom surface of the first substrate in the cross-sectional view, and the shared horizontal plane of the first sensing electrode and the first driving electrode.

2. The display device of claim 1, wherein the second side surface of the lower bracket includes a first sub-side surface, a second sub-side surface, and a third sub-side surface that is recessed further than each of the first sub-side surface and the second sub-side surface, and the pressure sensor overlaps the third sub-side surface and is embedded in a side surface portion formed by the first to third sub-side surfaces.

3. The display device of claim 1, wherein the pressure sensor further includes a second substrate and the first sensing electrode, wherein the second substrate is attached to the lower bracket, and wherein the second substrate faces the first substrate and is disposed between the second side surface of the lower bracket and the first driving electrode.

4. The display device of claim 3, wherein a strength of the first substrate is greater than a strength of the second substrate, and the first substrate further includes a rigid reinforcing material.

5. A display device, comprising:

a display panel including a first side surface and a first lower surface that is connected to the first side surface, the first lower surface being arranged opposite to a display surface of the display panel;

a pressure sensor disposed on the first lower surface of the display panel; and a lower bracket including a second lower surface facing the first lower surface of the display panel and a second side surface facing the first side surface of the display panel, wherein the pressure sensor is disposed between the first lower surface of the display panel and the second lower surface of the lower bracket and the pressure sensor is disposed on the second side surface of the lower bracket, wherein the pressure sensor includes a first substrate facing the second side surface of the lower bracket, a first pressure sensing layer disposed between the first substrate and the second side surface of the lower bracket, a first driving electrode disposed between the first pressure sensing layer and the second side surface of the lower bracket, and a first sensing electrode spaced apart from the first driving electrode, wherein a gap is present between the first pressure sensing layer and the first driving electrode and the gap is also present between the first pressure sensing layer and the first sensing electrode, wherein the first driving electrode and the first sensing electrode are disposed directly on the second side surface of the lower bracket.

6. The display device of claim 1, wherein the pressure sensor further includes a second driving electrode disposed between the second side surface of the lower bracket and the first pressure sensing layer, a second sensing electrode spaced apart from the second driving electrode, and a second pressure sensing layer that is in contact with both the second driving electrode and the second sensing electrode.

7. The display device of claim 1, wherein the first pressure sensing layer overlaps the first driving electrode and the first sensing electrode, and the pressure sensor further includes a second pressure sensing layer that is in contact with both the first driving electrode and the first sensing electrode and is spaced apart from the first pressure sensing layer, wherein the first pressure sensing layer includes a pattern recessed in one direction, and wherein the second pressure sensing layer is disposed in a recessed area of the first pressure sensing layer.

8. The display device of claim 1, wherein the first driving electrode extends in parallel with the first sensing electrode.

9. The display device of claim 1, wherein the first driving electrode and the first sensing electrode extend in directions crossing each other.

10. The display device of claim 1, wherein the first driving electrode includes a first portion extending in a first direction and a second portion extending from the first portion in a second direction, which crosses the first direction, the first sensing electrode includes a third portion extending in the first direction and a fourth portion extending from the third portion in the second direction, the first portion overlaps the third portion, and the second portion overlaps the fourth portion.

11. The display device of claim 1, wherein the pressure sensor includes a first pressure cell and a second pressure cell, the first pressure cell includes the first driving electrode, the first sensing electrode, the first pressure sensing layer overlapping both the first driving electrode and the first sensing electrode, and a second pressure sensing layer that is in contact with both the first driving electrode and the first sensing electrode and spaced apart from the first pressure sensing layer, the second pressure cell includes the first driving electrode, a second sensing electrode, and a third pressure sensing layer that is in contact with both the first driving electrode and the second sensing electrode, and the second pressure sensing layer and the third pressure sensing layer each overlap the first pressure sensing layer.

12. The display device of claim 1, wherein the pressure sensor includes a first pressure cell and a second pressure cell, the first pressure cell includes the first driving electrode, the first sensing electrode, the first pressure sensing layer overlapping both the first driving electrode and the first sensing electrode, and a second pressure sensing layer that is in contact with both the first driving electrode and the first sensing electrode and spaced apart from the first pressure sensing layer, the second pressure cell includes the first driving electrode, a second sensing electrode, and a third pressure sensing layer that is in contact with both the first driving electrode and the second sensing electrode, and the first pressure sensing layer is disposed between the second pressure sensing layer and the third pressure sensing layer.

13. The display device of claim 1, wherein the pressure sensor includes a first pressure cell and a second pressure cell, the first pressure cell includes the first driving electrode, the first sensing electrode, the first pressure sensing layer overlapping the first driving electrode and the first sensing electrode, and a second pressure sensing layer that is in contact with both the first driving electrode and the first sensing electrode and is spaced apart from the first pressure sensing layer, the second pressure cell includes the first driving electrode, a second sensing electrode, and a third pressure sensing layer that is in contact with both the first driving electrode and the second sensing electrode, and the second pressure sensing layer is disposed between the first pressure sensing layer and the third pressure sensing layer.

14. The display device of claim 1, wherein
the pressure sensor includes a first pressure cell, a second pressure cell, and a third pressure cell disposed between the first pressure cell and the second pressure cell, the first pressure cell includes the first driving electrode, the first sensing electrode, the first pressure sensing layer overlapping both the first driving electrode and the first sensing electrode, and a second pressure sensing layer that is in contact with both the first driving electrode and the first sensing electrode and is spaced apart from the first pressure sensing layer, the second pressure cell includes the first driving electrode, a second sensing electrode, a third pressure sensing layer overlapping both the first driving electrode and the second sensing electrode, and a fourth pressure sensing layer that is in contact with both the first driving electrode and the second sensing electrode and is spaced apart from the third pressure sensing layer, the third pressure cell includes the first driving electrode, a third sensing electrode, and a fifth pressure sensing layer that is in contact with both the first driving electrode and the third sensing electrode, and the fifth pressure sensing layer is disposed between the first pressure sensing layer and the third pressure sensing layer.

15. The display device of claim 1, wherein
the pressure sensor includes a first pressure cell, a second pressure cell, and a third pressure cell disposed between the first pressure cell and the second pressure cell, the first pressure cell includes the first driving electrode, the first sensing electrode, the first pressure sensing layer overlapping both the first driving electrode and the first sensing electrode, and a second pressure sensing layer that is in contact with both the first driving electrode and the first sensing electrode and is spaced apart from the first pressure sensing layer, the second pressure cell includes the first driving electrode, a second sensing electrode, a third pressure sensing layer overlapping both the first driving electrode and the second sensing electrode, and a fourth pressure sensing layer that is in contact with both the first driving electrode and the second sensing electrode and is spaced apart from the third pressure sensing layer, the third pressure cell includes the first driving electrode, a third sensing electrode, and a fifth pressure sensing layer that is in contact with both the first driving electrode and the third sensing electrode, and the fifth pressure sensing layer is disposed between the first pressure sensing layer and the fourth pressure sensing layer.

16. The display device of claim 1, wherein
the pressure sensor includes a first pressure cell, a second pressure cell, and a third pressure cell disposed between the first pressure cell and the second pressure cell, the first pressure cell includes the first driving electrode, the first sensing electrode, the first pressure sensing layer overlapping both the first driving electrode and the first sensing electrode, and a second pressure sensing layer that is in contact with both the first driving electrode and the first sensing electrode and is spaced apart from the first pressure sensing layer, the second pressure cell includes the first driving electrode, a second sensing electrode, a third pressure sensing layer overlapping both the first driving electrode and the second sensing electrode, and a fourth pressure sensing layer that is in contact with both the first driving electrode and the second sensing electrode and is spaced apart from the third pressure sensing layer, the third pressure cell includes the first driving electrode, a third sensing electrode, and a fifth pressure sensing layer that is in contact with both the first driving electrode and the third sensing electrode, and the fifth pressure sensing layer is disposed between the second pressure sensing layer and the fourth pressure sensing layer.

17. A display device comprising:
a display panel including a first side surface and a first lower surface that is connected to the first side surface, the first lower surface being arranged opposite to a display surface of the display panel;

a pressure sensor disposed on the first lower surface of the display panel; and a lower bracket including a second lower surface facing the first lower surface of the display panel and a second side surface facing the first side surface of the display panel, wherein the pressure sensor is disposed between the first lower surface of the display panel and the second lower surface of the lower bracket and the pressure sensor is disposed on the second side surface of the lower bracket, wherein the second side surface of the lower bracket includes a first sub-side surface, a second sub-side surface, and a third sub-side surface that is thinner in a first direction than either the first sub-side surface or the second sub-side surface, in the first direction, and wherein the pressure sensor overlaps the third sub-side surface, in the first direction, without overlapping either the first sub-side surface or the second sub-side surface, in the first direction, and is embedded in a side surface portion formed by the first to third sub-side surfaces.

18. The display device of claim 17, wherein
the pressure sensor includes a first substrate facing the second side surface of the lower bracket, a first pressure sensing layer disposed between the first substrate and the second side surface of the lower bracket, a first driving electrode disposed between the first pressure sensing layer and the second side surface of the lower bracket, and a first sensing electrode spaced apart from the first driving electrode, and a gap is present between the first pressure sensing layer and the first driving electrode and the gap is also present between the first pressure sensing layer and the first sensing electrode.

19. The display device of claim 18, wherein the pressure sensor further includes a second substrate and the first sensing electrode, wherein the second substrate is attached to the lower bracket, and wherein the second substrate faces the first substrate and is disposed between the second side surface of the lower bracket and the first driving electrode.

20. The display device of claim 18, wherein the first driving electrode and the first sensing electrode are disposed directly on the second side surface of the lower bracket.

\* \* \* \* \*